United States Patent [19]
Ysker

[11] Patent Number: 6,012,351
[45] Date of Patent: Jan. 11, 2000

[54] ROTARY INDEXING SHIFTER

[75] Inventor: John A. Ysker, Minneapolis, Minn.

[73] Assignee: Thunderbolt Enterprises, Inc., Minneapolis, Minn.

[21] Appl. No.: 08/771,867

[22] Filed: Dec. 23, 1996

[51] Int. Cl.[7] ................................................. B60K 20/00
[52] U.S. Cl. ........................... 74/473.15; 74/473.21; 74/502.2; 180/336
[58] Field of Search ....................... 74/473.15, 473.21, 74/497, 501.6, 504, 402.2, 337.5; 180/336

[56] References Cited

U.S. PATENT DOCUMENTS

| | | | |
|---|---|---|---|
| 4,574,652 | 3/1986 | Shichinohe et al. | 74/474 |
| 4,620,453 | 11/1986 | Kumazawa | 74/337.5 |
| 4,624,350 | 11/1986 | Akashi | 74/337.5 |
| 4,629,206 | 12/1986 | Omagari et al. | 180/336 |
| 4,938,733 | 7/1990 | Patterson | 74/502.2 |
| 5,174,172 | 12/1992 | Kanemura et al. | 74/857 |
| 5,370,015 | 12/1994 | Moscatelli | 74/335 |
| 5,481,934 | 1/1996 | Tagawa | 74/502.2 |
| 5,588,331 | 12/1996 | Huang et al. | 74/489 |
| 5,661,999 | 9/1997 | Carone | 180/336 |
| 5,676,022 | 10/1997 | Ose | 74/502.2 |

*Primary Examiner*—Tamara L. Graysay
*Assistant Examiner*—David M. Fenstermacher
*Attorney, Agent, or Firm*—Nawrocki, Rooney & Sivertson, P.A.

[57] ABSTRACT

A method and apparatus for shifting gears in a multi-speed manual transmission. Shifting is accomplished through translation of a linear axial movement of a rotary channel cam indexer to an angular rotation of a rotary channel cam. The rotary channel cam has a cam groove supporting cam followers to translate angular rotation of the rotary channel cam to axial movement of a plurality of transmission shift shafts. The positioning of the plurality of transmission shift shafts places the multi-speed manual transmission into a desired gear.

72 Claims, 9 Drawing Sheets

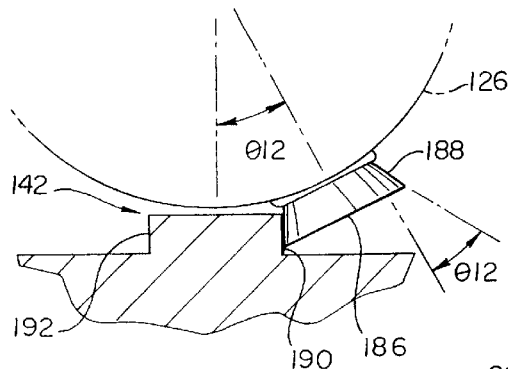
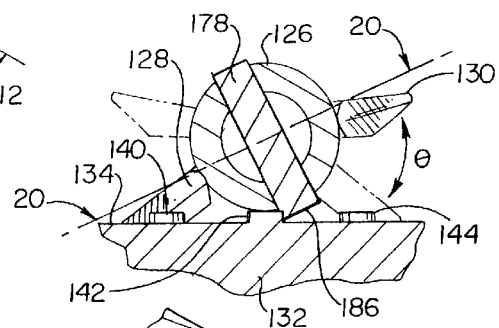
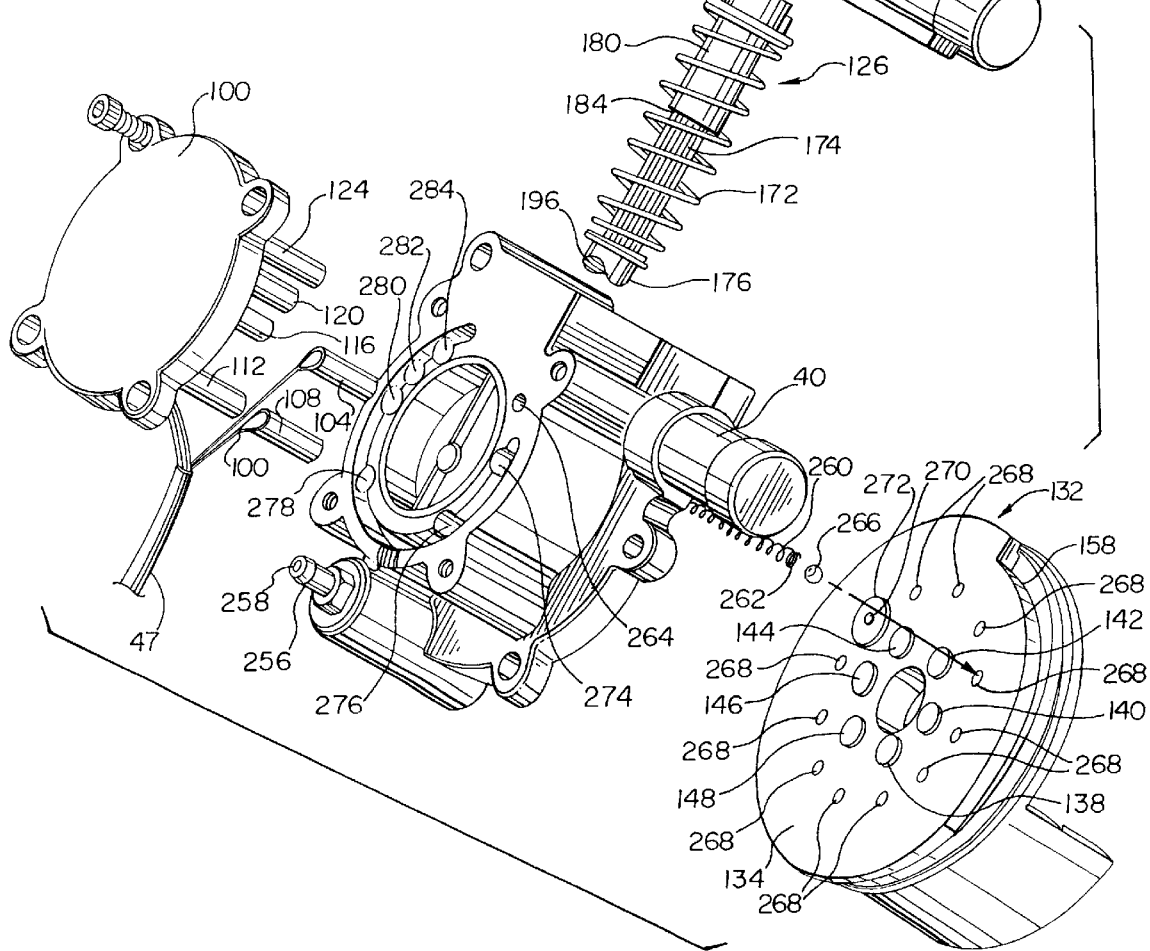

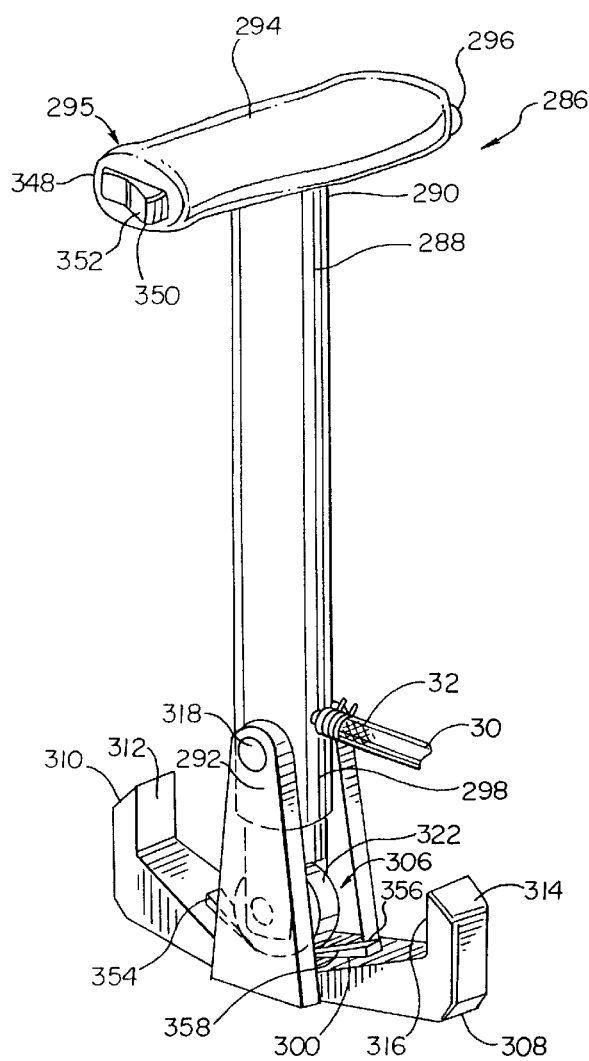
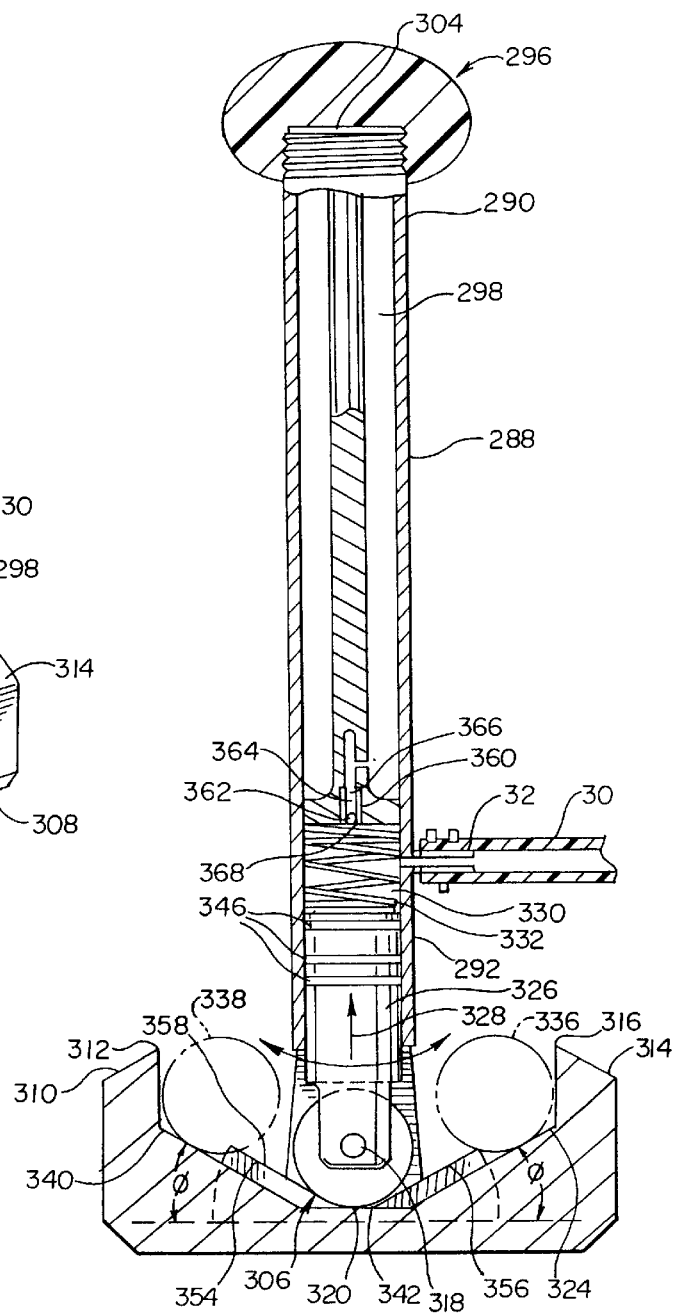
Fig. 23
Fig. 24

ROTARY INDEXING SHIFTER

CROSS REFERENCE TO CO-PENDING APPLICATIONS

The present application is related to U.S. patent application Ser. No. 08/771,477, filed Dec. 23, 1996, now abandoned entitled "Driveshaft and Motor Mount", and to U.S. patent application Ser. No. 29/052,319, filed Apr. 3, 1996, now U.S. Pat. No. Des. 378,996 entitled "Motorcycle Frame", which are assigned to the assignee of the present invention and are incorporated herein by reference.

BACKGROUND OF THE INVENTION

1. Field of the Invention

The present invention generally relates to a vehicle transmission shifting mechanism for motorized vehicles. More particularly it relates to a rotary indexing shifting mechanism for a motorized vehicle transmission having means to place the transmission in a neutral, or any forward or reverse gears.

2. Description of the Prior Art

There have been many improvements over the years in manual shift multi-speed transmissions, including improvements relating to the shifting of sliding gear manual transmissions. Shift mechanisms generally include a shift stick or pivotal shift lever associated with a series of linkages to engage or disengage the gears of the transmission. In a typical prior art shifting mechanism, the shifting lever controls the movement of parallel shifting linkages through a mechanical means resulting in longitudinal sliding of the shift linkages. Typical 5-speed transmissions having reverse require two such linkages, and the required number of linkages increases as the number of gear ratios available from the transmission increases. Shifting is accomplished through lateral and longitudinal movement of the shift control lever, typically in an "H" pattern for a 5-speed transmission, to engage the transmission in a selected gear. The lateral and longitudinal movement of the shift control lever increases and the number of gear ratios available from the transmission increases. Typical multi-speed transmission utilize shifting forks to axially drive the gears into engagement where each shifting fork is capable of engaging two gears. The plurality of shifting forks required for transmissions having more than two speeds are fixed through attachment means to the parallel shift linkages. Longitudinal movement of the shift linkages results in engagement of the transmission in the desired gear. This shifting mechanism including the parallel shift linkages is limited in applications due to its bulk and weight.

One disadvantage of this arrangement is that the parallel shift linkages must be stiff and rigid to control the engagement and disengagement of the gears of the transmission. Typically this limits application of the shifting mechanism due to the required space needed to incorporate the parallel shifting linkages, and thus is limited to applications where the shift control lever can be rigidly mounted to a frame or other non-movable part of a vehicle body. The space required for the shift linkages is considerable and as it must be kept clear of obstacles for movement of the shift linkages, results in an inefficient use of space and is typically limited to automotive applications.

Another disadvantage of the shift mechanism is the considerable lateral and longitudinal movement required of the shift control lever to control the shift linkages to engage the transmission in the desired gear. The degree of movement increases as the number of gear ratios available from the transmission increases.

Gear shifting mechanisms are also used in recreational vehicles, such as motorcycles and three- or four-wheel vehicles. Typically these recreational vehicles utilize small gas motorcycle engines having conventional motorcycle transmissions. One example is the engine and transmission manufactured by Harley-Davidson. In the three- or four-wheeled application, the motorcycle and transmissions are adapted from a two-wheel application. A disadvantage is that the motorcycle transmission does not typically have a reverse gear capability as does the manual shift multi-speed transmission used for automotive and other larger vehicle applications. Another disadvantage is these typically utilize high-maintenance chain or belt drives to drive a rear axle associated with the rear drive wheels, and have no means to associate the motorcycle engine with higher reliability automotive transmissions or transaxels having fully enclosed drive trains such as those manufactured by Volkswagen. The automotive transmissions or transaxels are limited in this application due to the required space needed to incorporate the parallel shifting linkages with conventional shifting mechanism. These are also limited as the shift control lever must be rigidly mounted to a frame or other non-movable part of the vehicle body. Current gear shifting mechanisms however still lack the requisite low weight and compact design required for the recreational vehicle applications.

SUMMARY OF THE INVENTION

It is an object of the present invention to overcome the disadvantages noted above by providing a compact and light weight shifting mechanism to shift a multi-speed manual transmission, where shifting the transmission to selectively engage a desired gear can be conveniently accomplished through use of a shift lever apparatus. The shift lever apparatus requires no lateral pivoting or rigid attachment to the vehicle body and is hydraulically actuated and is coupled to the shifting mechanism through flexible hydraulic line. A single direction motion on the shift lever of the shift lever apparatus results in the shifting mechanism selectively engaging the transmission in any desired gear. An advantage is no rigid or bulky shift linkages are required. A further advantage is the shift lever apparatus can be mounted in any fixed or moveable location and the shift lever requires only a short linear range of motion to selectively engage the transmission in any desired gear. Another advantage is a power-assist mode of operation which allows the use of engine oil pressure to assist in shifting the transmission.

In one preferred embodiment of the present invention, the linear shift apparatus, hereinafter called a hydraulic shift lever apparatus, is coupled through a hydraulic line and is in fluid communication with a rotary indexing shifter. The shift lever is pivotally connected to the hydraulic shift lever apparatus, and when depressed forces hydraulic fluid under pressure through a hydraulic line to axially move a rotary channel cam indexer of the rotary indexing shifter. As the rotary channel cam indexer moves, either an up-shift pawl or a down-shift pawl contact one of six dowels of the rotary channel cam, thus translating the axial linear movement of the rotary channel cam indexer to an angular rotation of the rotary channel cam. The angular rotation of the rotary channel cam is proportional to the axial linear movement of the rotary channel cam indexer. The linear movement of the rotary channel cam indexer from a home position to a full extension distance allows an angular rotation of 60° of the rotary channel cam to shift from any gear into a next higher or next lower sequential gear, and an angular rotation of 30° of the rotary channel cam to shift from any gear into neutral. The rotary channel cam has a cam groove which supports either a reverse roller cam follower, a first and second gear roller cam follower, or a third and fourth gear roller cam follower. Thus as rotary channel cam is rotated at 30° or 60°, the roller cam followers riding in the cam groove result in an axial movement of a reverse shift shaft, a first and second gear shift shaft, or a third and fourth gear shift shaft. Through this axial positioning of either the reverse shift shaft, first and second gear shift shaft, or third and fourth gear shift shaft, the transmission can be placed in reverse gear, neutral, or any of the forward gears.

In another preferred embodiment there is also provided means for the rotary indexing shifter to select an upshift or downshift mode through a shift direction switch which is electrically connected to an up-shift solenoid and a down-shift solenoid. The shift direction switch further has two positions. In the first position the up-shift solenoid is activated. In the second position the down-shift solenoid is activated. The shift direction switch determines whether the current indexing direction of the rotary indexing shifter is in sequentially increasing or sequentially decreasing gear numbers.

In yet another embodiment of the present invention there are means to prevent an unintentional engagement of reverse gear. A reverse lockout switch is electrically connected to a reverse solenoid of the rotary indexing shifter such that when the reverse lockout switch is slidably moved and activated, the reverse solenoid is activated and will allow the rotary indexing shifter to be shifted into the reverse gear.

In yet another embodiment of the present invention, there are means for indication of the current engagement gear. Thus when the rotary channel cam is rotated in either a clockwise or counter-clockwise direction, and the transmission is placed in one of the forward gear ratios, neutral, or reverse, the appropriate gear will be indicated. Magnetic reed switches provide a means of indication to a plurality of indicator lights corresponding to each of the forward gears, neutral, or reverse gear. Thus when the orientation of the rotary channel cam is such that one of the plurality of magnetic reed switches is positioned in close proximity to a magnet, the magnetic reed switch corresponding to the selected gear will electrically close and provide an electrical signal to a suitable means of indication such as a corresponding gear indicator light.

In yet another embodiment of the present invention, a "power assist" mode is available to select the current engagement gear. In this embodiment the oil pressure created within the internal oil reservoir of an internal combustion engine is utilized to provide hydraulic fluid pressure to cause the rotary indexing shifter to shift with an activation of a microswitch. The pressure assisted hydraulic shifting apparatus utilizes an auto shifter lockout switch to select between the "power assist" and "manual" shifting modes. A microswitch can be coupled to a foot-operated clutch pedal. When the auto shifter lockout switch is positioned to select the power assist mode, and the foot-operated clutch pedal is engaged, the microswitch is engaged in the first position, thus providing power to the relay solenoid. A relay solenoid is coupled to a hydraulic relay and allows the hydraulic relay to couple the internal oil reservoir of the engine to an hydraulic intensifier. The hydraulic intensifier increases the input oil pressure from the internal oil reservoir of engine by a factor of four and couples it to the rotary indexing shifter through a shuttle valve, thus causing a shifting of gears to occur.

In yet another alternative embodiment of the present invention, a manual shifting assembly may be used in place of the hydraulic shift arm apparatus. As a mechanical shift arm of the manual shifting assembly is moved linearly from a neutral to the upshift or downshift position, the first arm rotates an indexing lever resulting in a vertical translational movement of a mechanical rotary channel cam indexer thus causing a shifting of gears to occur. In addition, a second arm moves longitudinally resulting in a clockwise or counterclockwise rotation of the mechanical rotary channel cam indexer to rotatably position the mechanical rotary channel cam indexer into either the upshift or downshift position.

In yet another embodiment, the present invention includes a method of shifting a transmission. The method includes pivotally depressing and activating the shift lever of the hydraulic shift lever apparatus to force the hydraulic fluid under pressure through a hydraulic line to move the rotary channel cam indexer of the rotary indexing shifter axially in an upward vertical direction. The method further includes contacting the up-shift pawl or down-shift pawl with one of the six dowels of the rotary channel cam to translate the linear movement of rotary channel cam indexer to an angular rotation of the rotary channel cam of 60° to shift from any gear into a next higher or lower sequential gear, or 30° to shift from any gear into neutral. The method further includes an axial movement of the reverse shift shaft, first and second gear shift shaft, or third and fourth gear shift shaft through the roller cam followers riding in the cam groove as the rotary channel cam is rotated at 30° or 60° to result in placement of the transmission in either reverse gear, neutral, or any of the forward gears.

The method further includes selecting whether the current indexing direction of the rotary indexing shifter is in sequentially increasing or sequentially decreasing gear numbers. The method includes selecting an upshift or down-shift mode through activation of the shifter direction switch. The method includes positioning the shifter direction switch in either the upshift mode to activate the up-shift solenoid, or the down-shift mode to activate the down-shift solenoid. In one embodiment, the indexing direction of the rotary indexing shifter is in sequentially increasing or sequentially decreasing gear numbers when the shifter direction switch is positioned in either the upshift mode to activate the up-shift solenoid, or the down-shift mode to activate the down-shift solenoid, respectively.

The method further includes a method to allow engagement of the reverse gear. The method includes activating the reverse lockout switch to activate the reverse solenoid to allow the rotary indexing shifter to be shifted into a reverse gear.

In yet another embodiment, the present invention includes a method of indicating the current transmission engagement gear. The method includes rotating the rotary channel cam in a clockwise or counter-clockwise direction to place the transmission in one of the forward gear ratios, neutral, or reverse. The method further includes indicating the current gear by orientating the rotary channel cam such that one of a plurality of magnetic reed switches is positioned in close proximity to the magnet thus "closing" the magnetic reed switch corresponding to the selected gear. The method also includes a means for indication by providing an electrical signal to illuminate a corresponding gear indicator light.

In yet another embodiment, the present invention includes a method of selecting a "power assist" mode and of shifting the transmission. The method includes enabling the auto shifter lockout switch to select the "power assist" mode. The method further includes shifting the transmission by activating the microswitch through means such as by coupling the microswitch to a foot-operated clutch pedal and engaging the foot-operated clutch pedal to engage the microswitch. The method includes providing power to the relay solenoid to allow the hydraulic relay to couple the internal oil pressure created within the internal oil reservoir of an internal combustion engine to the hydraulic intensifier. The method also includes increasing the input oil pressure by a factor of four through the hydraulic intensifier and coupling it to the rotary indexing shifter through the shuttle valve. The method also includes activating the rotary indexing shifter to place the transmission in reverse gear, neutral, or any forward gear.

In still yet another alternative embodiment, the present invention includes a method of manually shifting a transmission. This method includes moving a mechanical shift arm of the manual shifting assembly linearly from a neutral to the upshift or down-shift position. This method further includes moving a first arm to rotate indexing lever to provide a vertical translational movement to a mechanical rotary channel cam indexer. This method includes the vertical translational movement of the mechanical rotary channel cam indexer shifting the gears of the transmission to reverse, neutral, or any forward gear. This method further includes moving a second arm longitudinally to rotate the mechanical rotary channel cam indexer clockwise or counterclockwise to position the mechanical rotary channel cam indexer into either the upshift or downshift position.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 15 is a sectional view taken along line 15—15 in FIG. 14 showing the position of the rotary channel cam indexer during a shift operation;

FIG. 16 is a figure similar to that of FIG. 15 showing an enlarged view of the indexing pin stop;

FIG. 17 is an exploded perspective view;

FIG. 23 is a perspective view of the hydraulic shift arm apparatus;

FIG. 24 is a cut-away view of the hydraulic shift arm apparatus;

DETAILED DESCRIPTION OF THE PREFERRED EMBODIMENTS

Figure 1A:
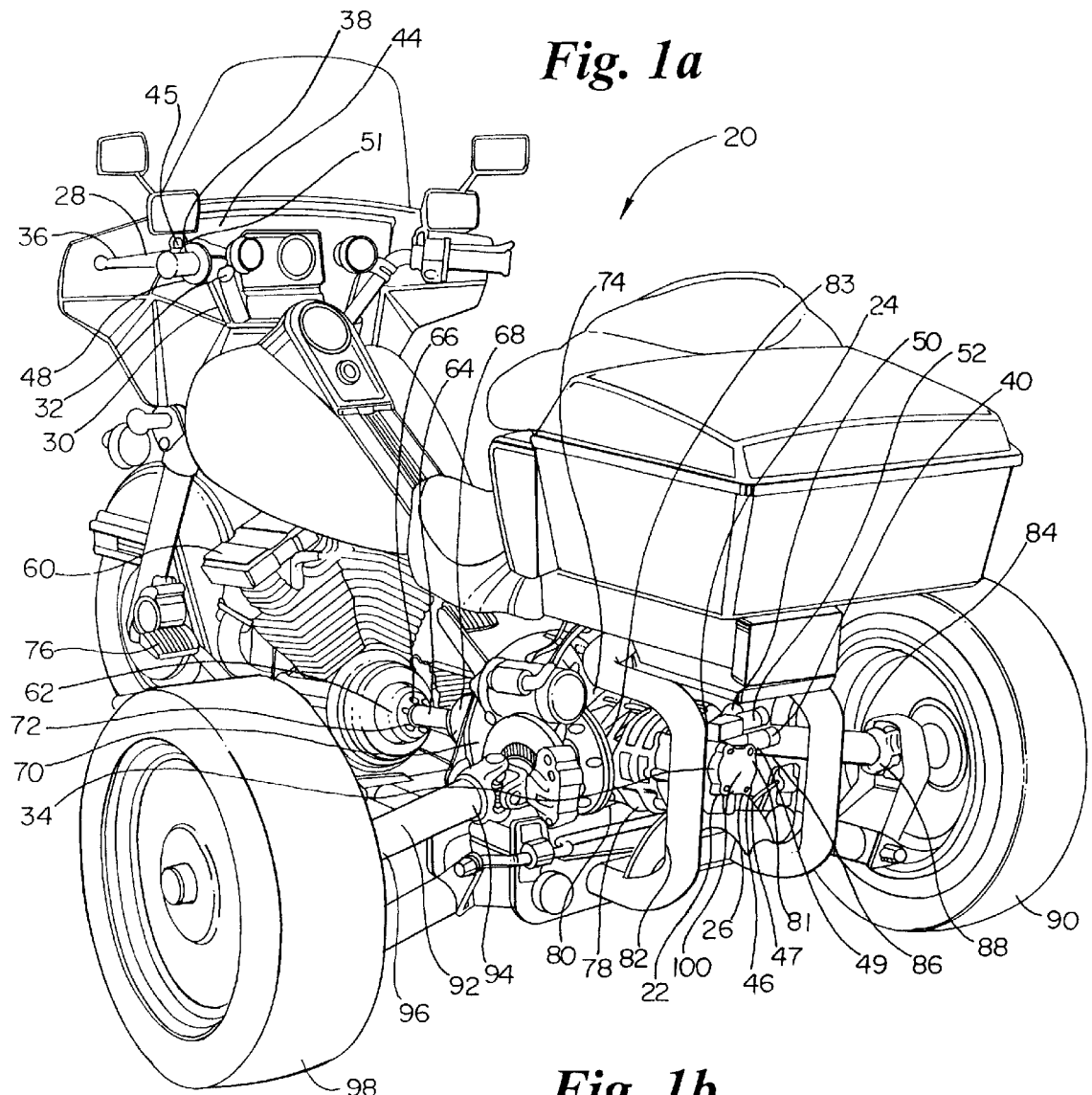
FIG. 1 is a perspective view of the "Rotary Indexing Shifter" invention.
FIG. 1b is a detailed view showing the hydraulic shift lever apparatus.
Figure 1B:
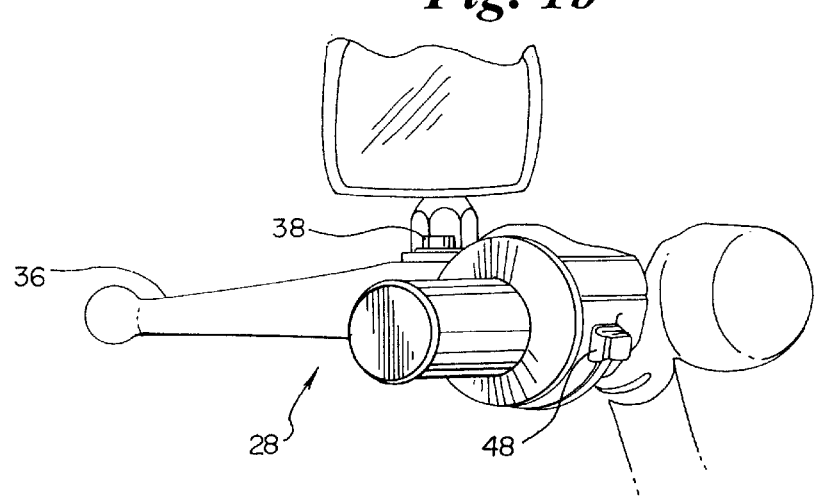

Referring now to the drawings, wherein like reference numerals refer to like elements throughout the several views, FIG. 1 shows a perspective view of the rotary index and shifter 22 in accordance with the present invention. FIG. 1 shows generally a three-wheel motorcycle 20 having a hydraulic shift lever apparatus 28 and hydraulic line 30. The hydraulic shift lever apparatus 28 is shown in detail in FIG. 1b. Hydraulic line 30 further has a proximal end 32 and a distal end 34. The proximal end 32 of hydraulic line 30 is in fluid communication with hydraulic shift lever apparatus 28. In addition, distal end 34 of hydraulic line 30 is in fluid communication with the proximal end 24 of rotary indexing shifter 22. Shift lever 36 is pivotally connected to hydraulic shift lever apparatus 28. When shift lever 36 is depressed, hydraulic shift lever apparatus 28 forces a piston against hydraulic fluid contained in a chamber (not shown), through means well known in the art, such that hydraulic fluid is forced under pressure into proximal end 32 of hydraulic line 30. Rotary indexing shifter 22, in fluid communication with distal end 34 of hydraulic line 30, therefore causes a shifting of gears to occur.

Figure 2:
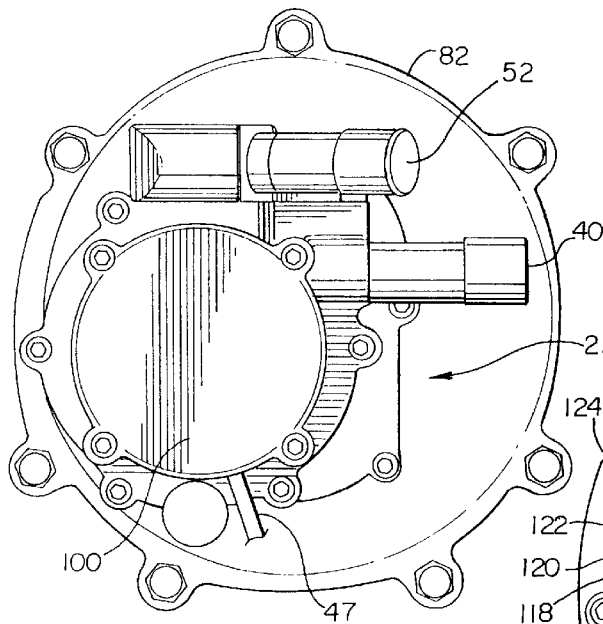
FIG. 2 is an elevational view showing the distal end of a transmission with the invention installed.
Figure 3:
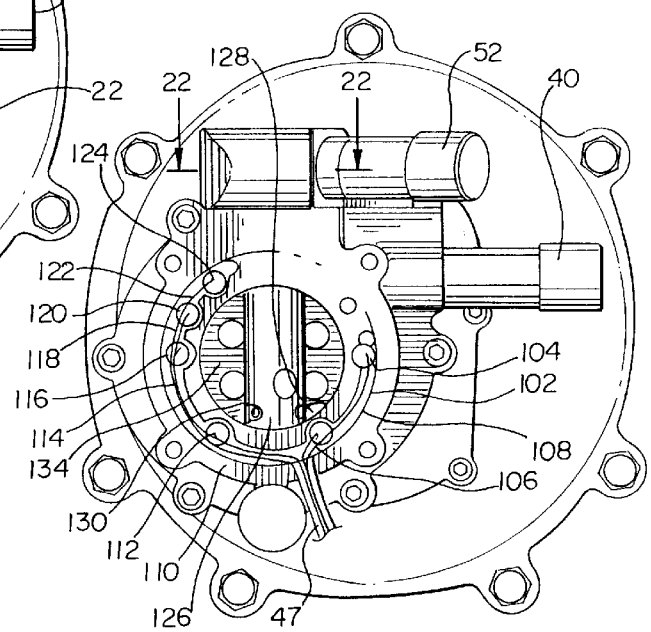
FIG. 3 is a figure similar to that of FIG. 2 with the top plate removed.
Figure 18:
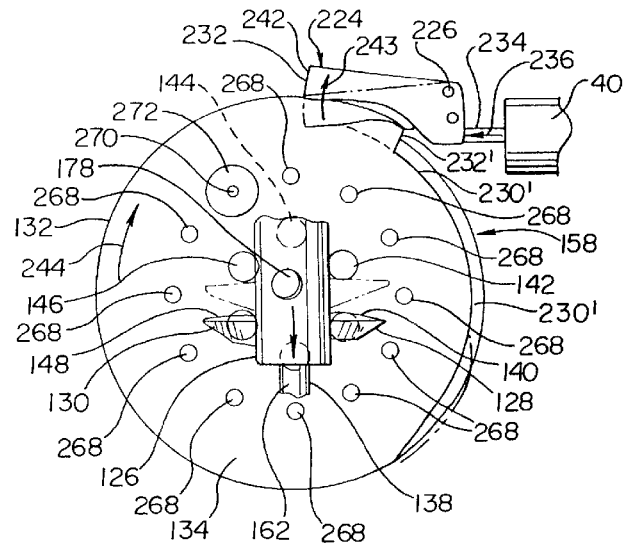
FIG. 18 is a top view similar to that of FIG. 13 showing progression from neutral to reverse with the shifting indexer in home return.

Reverse lockout switch 38 is electrically connected to reverse solenoid 40 and is discussed in reference to FIGS. 2-3 and 18. A reverse lockout switch wire (not shown) having a proximal end and a distal end. The proximal end of the reverse lockout switch wire is electrically connected to reverse lockout switch 38, and the distal end of reverse lockout switch wire is electrically connected to reverse solenoid 40. When reverse lockout switch 38 is slidably positioned, reverse solenoid 40 is activated, thus allowing rotary indexing shifter 22 to be shifted into a reverse gear.

Three-wheel motorcycle 20 further has a shifter direction switch 48 which is electrically connected to up-shift solenoid 50 and down-shift a solenoid 52 through solenoid wiring harness (not shown). The proximal end of the solenoid wiring harness is electrically connected to shift direction switch 48 through an up-shift solenoid wire and a down-shift solenoid wire, and the distal end of solenoid wiring harness is electrically connected to up-shift solenoid 50 and down-shift solenoid 52 through the up-shift solenoid wire and the down-shift solenoid wire respectively. Shift direction switch 48 further has two positions. In the first position, up-shift solenoid 50 is activated (see FIG. 17). In the second position, down-shift solenoid 52 is activated. Shift direction switch 48 determines whether the current indexing direction of the rotary indexing shifter 22 is in sequentially increasing or sequentially decreasing gear numbers.

Three-wheel motorcycle 20 further has an engine 60 with a shaft 62. Shaft 62 is rotatably connected to proximal end 72 of clutch 70 through drive shaft 64. Drive shaft 64 has a proximal end 66 and a distal end 68. Proximal end 66 of drive shaft 64 is rotatably connected to shaft 62. Distal end 68 of drive shaft 64 is rotatably connected to proximal end 72 of clutch 70. Clutch 70 further has a distal end 74 which is rotatably connected to proximal end 80 of transmission 78. Transmission 78 further has a distal end 82 which is selectively engaged to proximal end 24 of rotary indexing shifter 22. Rotary indexing shifter 22, when activated through shift lever 36, selects the current engagement gear ratio for transmission 78. As determined by the current gear ratio, a rotation of drive shaft 64 causes a rotation of the right axle 84 and left axle 92. Right axle 84 has a proximal end 86 and a distal end 88. Proximal end 86 of right axle 84 is rotatably connected to right output 81 of transmission 78. Distal end 88 of right axle 84 is rotatably connected to right wheel 90. Transmission 78 is also connected to left axle 92. Proximal end 94 of left axle 92 is rotatably connected to left output 83 of transmission 78. Distal end 96 of left axle 92 is rotatably connected to left wheel 98. In this preferred embodiment, engine 60 provides a rotational force to the proximal end 66 of drive shaft 64 through shaft 62. Distal end 68 of shaft 64 transfers the rotational force to proximal end 80 of transmission 78 through clutch 70. Transmission 78 transfers through a selectable gear ratio the rotational force to right output 81 and left output 83. The selectable gear ratio is selected by rotary indexing shifter 22. At the selected gear ratio, the rotational force at the proximal end 80 of transmission 78 is transferred through right axle 84 and left axle 92, to right wheel 90 and left wheel 98.

In the preferred embodiment, four forward gear ratios and one reverse gear ratio are available from transmission 78. The gear ratio is selected through a combination of placing shift direction switch 48 in the appropriate one of two positions, and depressing and releasing shift lever 36 of hydraulic shift lever apparatus 28 the appropriate number of times to place transmission 78 into the desired gear. Shift lever 36, when depressed, results in hydraulic shift lever apparatus 28 communicating a fluid pressure to rotary indexing shifter 22, which results in the desired gear ratio change.

FIGS. 2–22 show generally the various components of rotary indexing shifter 22. FIG. 2 shows an elevational view of distal end 82 of transmission 78 with rotary indexing shifter 22 installed. FIG. 2 also shows magnetic reed switch wiring harness 47, up-shift solenoid 50, reverse solenoid 40, and top plate 100. Solenoid 52 is not shown. Magnetic reed switch wiring harness 47 provides a conduit for first wire 102 which is connected to first magnetic reed switch 104, second wire 106 which is connected to second magnetic reed switch 108, third wire 110 which is connected to third magnetic reed switch 112, fourth wire 114 which is connected to fourth magnetic reed switch 116, fifth wire 118 which is connected to fifth magnetic reed switch 120, and sixth wire 122 which is connected to sixth magnetic reed switch 124. First magnetic reed switch 104 provides electrical connection to a fourth gear indicator light (not shown). Second magnetic reed switch 108 provides electrical connection to a third gear indicator light (not shown). Third magnetic reed switch 112 provides electrical connection to a second gear indicator light (not shown). Fourth magnetic reed switch 116 provides electrical connection to a first gear indicator light (not shown). Fifth magnetic reed switch 120 provides electrical connection to a neutral indicator light (not shown). Sixth magnetic reed switch 124 provides electrical connection to a reverse gear indicator light (not shown). Two-position shift direction switch 48 alternately selects either up-shift solenoid 50 or down-shift solenoid 52 which rotate rotary channel cam indexer 126 in either a counter-clockwise or clockwise direction. Rotary channel cam indexer 126 is shown in FIG. 3, which is similar to FIG. 2 except that top plate 100 is removed.

Figure 22:
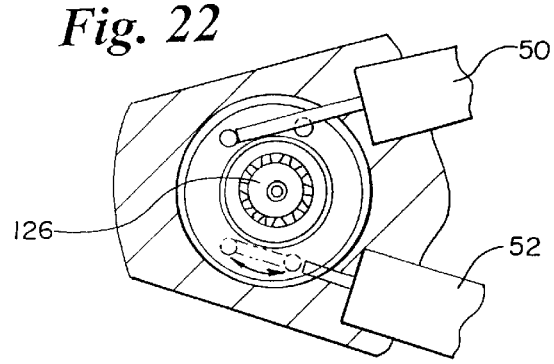
FIG. 22 is a sectional view taken along line 22—22 in FIG. 3.

FIG. 22 is a sectional view taken along line 22—22 as shown in FIG. 3, which further illustrates the rotary channel cam indexer 126. FIG. 22 shows up-shift solenoid 50, down-shift solenoid 52, and rotary channel cam indexer 126. As shift direction switch 48 is positioned in the down-shift location, down-shift solenoid 52 extends as shown in FIG. 22 to rotate rotary channel cam indexer 126 in a clockwise direction. The reciprocal is true for up-shift solenoid 50 when shift direction switch 48 is moved into the up-shift position. When rotary channel cam indexer 126 is rotated either clockwise or counter-clockwise by up-shift solenoid 50 or down-shift solenoid 52, up-shift pawl 128 or down-shift pawl 130 contacts the distal surface 134 of rotary channel cam 132 as shown in FIGS. 13 and 14.

Figure 11:
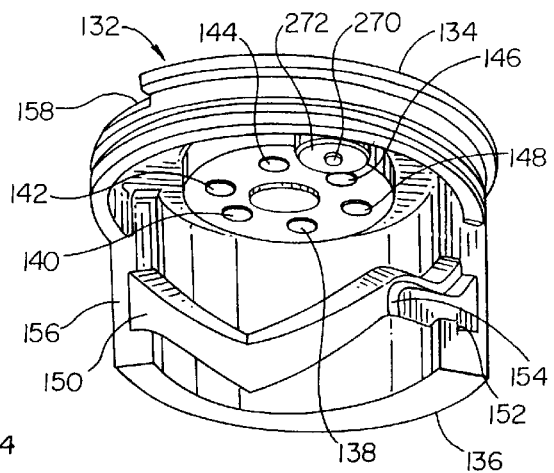
FIG. 11 is a perspective view of the rotary channel cam.

FIG. 11 shows a perspective view of the rotary channel cam 132 having a distal end 134 and a proximal end 136. Rotary channel cam 132 has a first dowel 138, a second dowel 140, a third dowel 142, a fourth dowel 144, a fifth dowel 146, and a sixth dowel 148. Rotary channel cam 132 also has a cam groove 150, a reverse cam slot 152, a reverse stick shaft stop 154, a forward shaft stop 156, and a reverse lock-out stop 158. Rotary channel cam 132 further has a magnet 270 inside aluminum slug 272.

Figure 13:
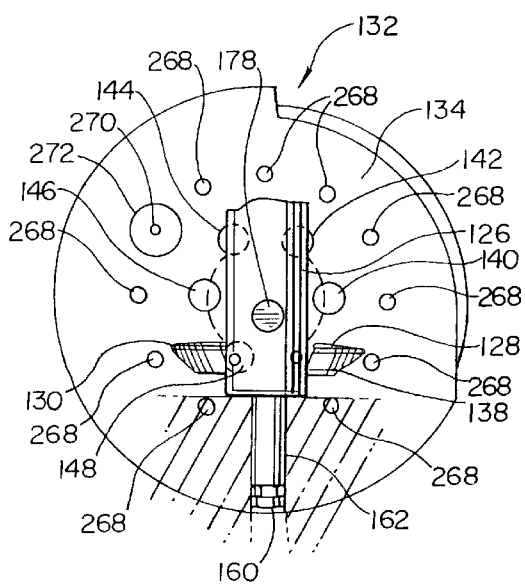
FIG. 13 is a top view of the rotary channel cam shifter mechanism.

FIG. 13 shows a top view of the rotary channel cam shifter mechanism. As rotary channel cam indexer 126 is rotated in either the up-shift or down-shift position, up-shift pawl 128 or down-shift pawl 130 contacts the distal surface 134 of rotary channel cam 132. When shift lever 36 is depressed, hydraulic shift lever apparatus 28 forces a hydraulic fluid pressure through hydraulic line 30 from proximal end 32 to distal end 34. Distal end 34 of hydraulic line 30 is in fluid communication with hydraulic fluid lumen 160 as shown in FIG. 13.

Figure 14:
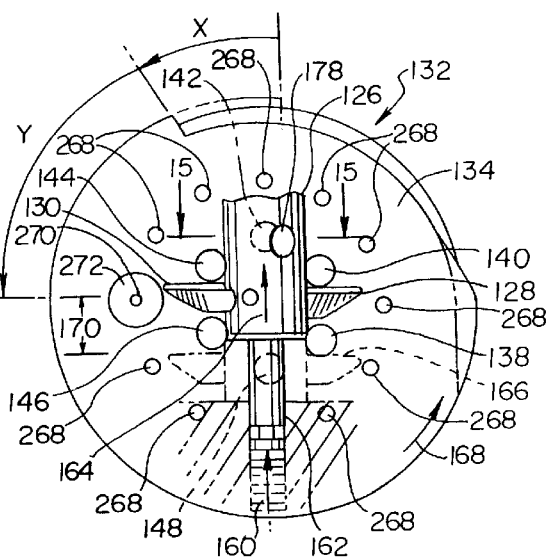
FIG. 14 is a figure similar to that of FIG. 13 showing the progression from neutral to first gear (X) and the subsequent progression to second gear.

FIG. 14 is a figure similar to that of FIG. 13 showing progression from neutral to first gear and subsequent progression to second gear. When shift lever 36 is depressed applying hydraulic fluid pressure through hydraulic fluid lumen 160 to hydraulic piston 162, rotary channel cam indexer 126 is moved axially in an upward vertical direction as shown by arrow 164. In the forward direction, up-shift solenoid 50 is engaged, thus allowing up-shift pawl 128 to contact distal surface 134 of rotary channel cam 132. As rotary channel cam indexer 126 moves axially in the direction of arrow 164 from home position 166, up-shift pawl 128 contacts second dowel 140 effectuating a counter-clockwise rotation of rotary channel cam 132 in the direction shown by arrow 168. Rotary channel cam indexer 126 has a full extension distance 170 allowing a maximum 60° of angular rotation of rotary channel cam 132. When shift lever 36 is fully depressed, hydraulic shift lever apparatus 28 ceases providing a fluid movement into hydraulic fluid lumen 160. At this point, rotary channel cam indexer 126 is fully extended by extension distance 170 from home position 166, and must utilize saddle spring 172 to provide a force opposing the direction of arrow 164 in order to return rotary channel cam indexer 126 to home position 166.

Figure 20:
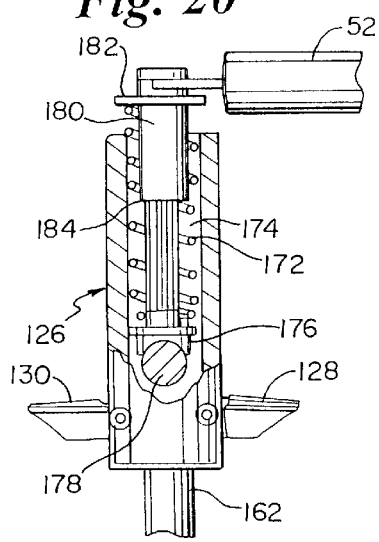
FIG. 20 is a top view with parts cut-away.

FIG. 20 shows a top cutaway view of rotary channel cam indexer 126 illustrating saddle spring 172, saddle shaft 174, escapement tension saddle 176, and indexing pin 178. Rotary channel cam indexer 126 further has a saddle shaft retainer 180 and spring base 182. Saddle spring 172 provides a tension between escapement tension saddle 176 and spring base 182. Furthermore, saddle shaft 174 slides within the shaft retainer lumen 184, thus allowing saddle spring 172 to be compressed by extension distance 170. Thus, during a shifting sequence from neutral to first gear, the hydraulic fluid movement into hydraulic fluid lumen 160 provides an upward force on hydraulic piston 162. Saddle spring 172 is subsequently compressed as saddle shaft 174 moves within shaft retainer lumen 184, thus providing means for a constant return force in the opposite direction of arrow 164. When hydraulic fluid pressure or fluid movement ceases due to shift lever 36 reaching its full extension and hydraulic shift lever apparatus 28 ceasing fluid movement activity, saddle spring 172 provides a return force to allow return of up-shift pawl 128 and down-shift pawl 130 to their original home positions 166. This enables up-shift pawl 128 to be repositioned to further rotate rotary channel cam 132 in a counter-clockwise direction to effectuate a subsequent gear shift, such as from first gear to second gear. It should be understood, however, that the same function in this respect as applied to the up-shift procedure also applies when down-shifting. In addition, although rotary channel cam indexer 126 can move extension distance 170 when shift lever 36 is fully depressed, rotary channel cam indexer 126 may be moved to a lesser distance, such as one-half of the extension distance 170 from home position 166, proximally corresponding to a commensurate partial depression of shift lever 36. It is further understood that although a full gear shift is accomplished by movement of rotary channel cam indexer of the extension distance 170, full movement may not be necessary if the position of rotary channel cam 132 is such that transmission 78 is in a neutral position or between any gears. Thus, FIG. 14 shows distance X corresponding to a 30° angular rotation of rotary channel cam 132 when shifting transmission 78 from neutral to first gear, and a rotation Y of 60° of counter-clockwise angular rotation of rotary channel cam 132 corresponding to shifting transmission 78 from first gear to second gear. Subsequent rotations of rotary channel cam 132 in 60° increments will place transmission 78 in third and fourth gears, respectively, but subsequent rotations of 30° from second gear or third gear, however, will place transmission 78 in a neutral position. Subsequently, to remove transmission 78 from neutral position to any gear, an angular rotation of at least 30° will be required.

The progression from neutral to first gear can be described as follows. Rotary channel cam indexer 126 is in home position 166. When shift lever 36 is depressed, hydraulic shift lever apparatus 28 forces fluid through hydraulic line 30 from proximal end 32 through distal end 34. Distal end 34 is in fluid communication with hydraulic fluid lumen 160, thus providing a pressure on hydraulic piston 162 which correspondingly moves rotary channel cam indexer 126 in the direction of arrow 164 as shown in FIG. 14. FIG. 14 shows rotary channel cam indexer in the up-shift position, thus up-shift pawl 128 is contacting distal surface 134. As rotary channel cam indexer moves in a direction axial to hydraulic piston 162 in the direction of arrow 164, up-shift pawl 128 contacts second dowel 140, thus translating the linear movement of rotary channel cam indexer 126 in the direction of arrow 164, to a counter-clockwise rotation of rotary channel cam 132. The distance of movement of rotary channel cam indexer 126 from home position 166 is proportional to the angular rotation of rotary channel cam 132. Linear movement of rotary channel cam indexer 126 from home position 166 to the arrival position corresponding with full extension 170 allows a maximum counter-clockwise angular rotation of 60° of rotary channel cam 132. First dowel 138, second dowel 140, third dowel 142, fourth dowel 144, fifth dowel 146, and sixth dowel 148 are equidistant about a circumference whose radius defined perpendicularly to the axis of rotation of rotary channel cam 132. Since the angle between each dowel is 60°, a full linear movement of rotary channel cam indexer in the direction of arrow 164 from home position 166 to an extension distance 170 must result in an angular rotation of any given dowel of 60°. Thus, at any given time, as shown in FIG. 14, a dowel will be located at the 12 o'clock, 2 o'clock, 4 o'clock, 6 o'clock, 8 o'clock and 10 o'clock positions. If transmission 78 is in neutral, however, a dowel will be located at any given time at the 1 o'clock, 3 o'clock, 5 o'clock, 7 o'clock, 9 o'clock and 11 o'clock positions. Movement of a dowel into these neutral positions results from a movement of rotary channel cam indexer 126 from home position 166 in the direction of arrow 164 of a distance approximately equivalent to one-half of extension distance 170. Movement a full extension distance 170, however, places transmission 78 in a gear by placing the dowels in either the 12 o'clock, 2 o'clock, 4 o'clock, 6 o'clock, 8 o'clock, or 10 o'clock positions. Thus, in FIG. 14, second dowel 140 was located at the 3 o'clock position or neutral position, while rotary channel cam indexer 126 was in home position 166. Movement of rotary channel cam indexer 126 a full extension distance 170, however, moves second dowel 140 from a 3 o'clock to the 2 o'clock position, resulting in a counter-clockwise rotation of rotary channel cam 132 of 30° as shown by X thus resulting in a shifting of transmission 78 from neutral to first gear.

When rotary channel cam 32 is undergoing the counter-clockwise rotation illustrated by X of 30°, means are necessary to halt rotation once rotary channel cam indexer 126 has reached extension distance 170. It is understood that the mechanical mass inherent in rotary channel cam 132 can result in a rotation beyond that required to positively place transmission 78 into first gear. The means necessary to halt the translational movement of rotary channel cam 132 upon full extension of rotary channel cam indexer 126 to extension distance 170 are provided through indexing pin stop 186 of indexing pin 178 as shown in FIG. 15. FIG. 15 is a sectional view taken along line 15—15 of FIG. 14. FIG. 15 shows rotary channel cam indexer in the up-shift position with up-shift pawl 128 contacting distal surface 134 of rotary channel cam 132. In FIG. 15, rotary channel cam indexer 126 is fully extended to extension distance 170 with second dowel 140 at the 2 o'clock position, and third dowel 142 at the 12 o'clock position (referring to FIG. 14).

Figure 12:
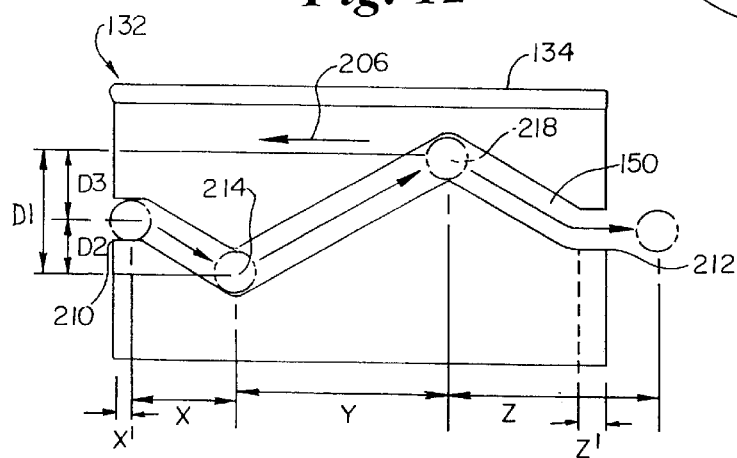
FIG. 12 is a simplified mechanical diagram showing the path of the roller cam followers inside the rotary channel cam.

Indexing pin stop 186 provides a mechanical stopping force against third dowel 142 to halt further mechanical rotation of rotary channel cam 132 in a counter-clockwise direction. It is to be understood that this illustration in FIG. 12 is exemplary and applies when shifting into any gear, whether in the up-shift or down-shift mode. FIG. 15 shows that when rotary channel cam indexer 126 is rotated by angle θ, up-shift pawl 128 contacts distal surface 134 of rotary channel cam 132. Thus, when rotary channel cam indexer 126 moves in direction of arrow 164 towards extension distance 170 from home position 166, rotary channel cam 132 is rotated in a counter-clockwise direction.

FIG. 16 is similar to that of FIG. 15, showing an enlarged view of indexing pin stop 186. It is seen that angle θ corresponds to angle θ in FIG. 15. Surface 188 of indexing pin stop 186 has a surface with angle θ/2 to allow parallel mating with edge 190 of third dowel 142. In FIG. 16, rotary channel cam indexer 126 is in the up-shift mode and third dowel 142 is at the 12 o'clock position (in reference to FIG. 14). When rotary channel cam indexer 126 is rotated by angle θ to place it in the down-shift mode, edge 188 would contact dowel surface 192, such that at the point of contact edge 188 and dowel surface 192 are parallel.

Figure 19:
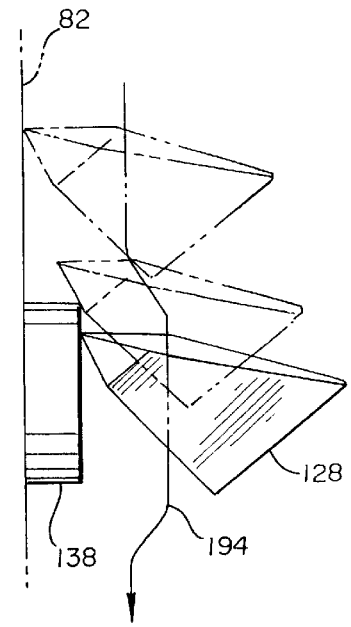
FIG. 19 is a simplified mechanical diagram showing the path of the indexing escapement.
Figure 21:
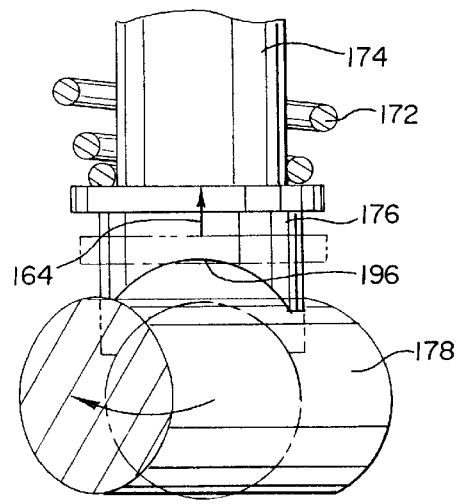
FIG. 21 is an enlarged view showing the escapement tension saddle.

After shifting transmission 78 into the desired gear and hydraulic fluid pressure is released, saddle spring 172 provides a return force against indexing pin 178 through escapement tension saddle 176. This force is in a direction opposing arrow 164 to move rotary channel cam indexer 126 to home position 166. Upon return to home position 166, up-shift pawl 128 must "ride over" first dowel 138. FIG. 19 shows a mechanical diagram of the path of the indexing escapement, which allows the up-shift pawl to ride over first dowel 138. It should be understood that the path of the indexing escapement is mechanically symmetrically identical to either the up-shift pawl 128 or down-shift pawl 130 riding over either the first dowel 138, second dowel 140, third dowel 142, fourth dowel 144, fifth dowel 146, or sixth dowel 148. Thus as up-shift pawl 128 is riding over first dowel 138, escapement tension saddle 176 allows rotation of indexing pin 178 due to the contoured shape of saddle surface 196 and the compression of saddle spring 172 in direction of arrow 164, as shown in FIG. 21.

Figure 4:
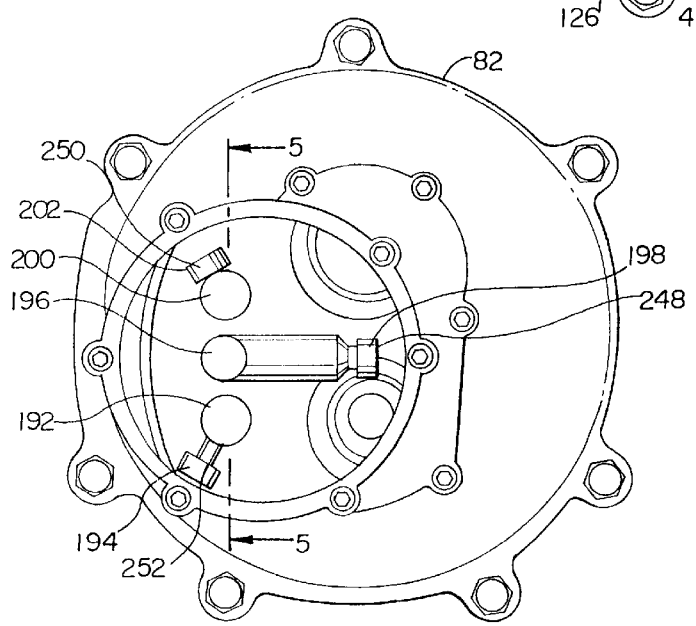
FIG. 4 is a figure similar to that of FIG. 3 with the shifter mechanism housing removed.

FIG. 4 shows a view of distal end 82 of transmission 78 with rotary indexing shifter 22 removed. Transmission 78 at distal end 82 has three shift shafts which extend distally beyond the distal end 82 of transmission 78. Reverse shift shaft 192 has reverse roller cam follower 194, first and second gear shift shaft 196 has first and second gear roller cam follower 198, and third and fourth gear shift shaft 200 has third and fourth gear roller cam follower 202. Reverse shift shaft 192, first and second gear shift shaft 196, and third and fourth gear shift shaft 200 move in an axial direction. The axial movement of reverse shift shaft 192, first and second gear shift shaft 196, and third and fourth gear shift shaft 200, results from a translation of rotary channel cam 132 corresponding with the movement of rotary channel cam indexer 126. Starting in either the up-shift or down-shift position, when rotary channel cam indexer 126 extends from home position 166 in the movement of arrow 164, to either an extension distance 170 or a lesser distance, rotary channel cam 132 undergoes a rotary translation corresponding with the amount of extension of rotary channel cam indexer 126. As shown in FIG. 12, rotary channel cam 132 has a cam groove 150 which can support either reverse roller cam follower 194, first and second gear roller cam follower 198, or third and fourth gear roller cam follower 202. Thus as rotary channel cam 132 is rotated at 30° or 60°, the roller cam followers riding in cam groove 150 result in an axial movement of reverse shift shaft 192, first and second gear shift shaft 196, or third and fourth gear shift shaft 200. Through this axial positioning of reverse shift shaft 192, first and second gear shift shaft 196, or third and fourth gear shift shaft 200, the transmission can be placed in either reverse gear, neutral, or any of forward gears 1–4. Referring to FIG. 4, the reverse gear selection is controlled by reverse shift shaft 192 and reverse roller cam follower 194. First and second gears are controlled by first and second gear shift shaft 196 and first and second gear roller cam follower 198. Third and fourth gears are controlled by third and fourth gear shift shaft 200 and third and fourth gear roller cam follower 202. Reverse shift shaft 192, first and second gear shift shaft 196, and third and fourth gear shift shaft 200 extend distally out of the distal end 82 of transmission 78. Reverse roller cam follower 194, first and second gear roller cam follower 198, and third and fourth gear roller cam follower 202 extend distally from reverse shift shaft 192, first and second gear shift shaft 196, and third and fourth gear shift shaft 200, respectively, and extend distally into the proximal end 136 of rotary channel cam 132. Reverse roller cam follower 194, first and second gear roller cam follower 198, and third and fourth roller cam follower 202 are rigidly attached to reverse shift shaft 192, first and second gear shift shaft 196, and third and fourth gear shift shaft 200, respectively, in an orientation which is axially perpendicular to the axis of the respective shift shafts. The axis of reverse roller cam follower 194, first and second gear roller cam follower 198, and third and fourth gear roller cam follower 202 are 120° apart in a circle defined by a radius which is perpendicular to the axis of the shift shafts. As rotary channel cam 132 is rotated, the reverse roller cam follower 194, first and second gear roller cam follower 198, or third and fourth gear roller cam follower 202 one at a time ride inside cam groove 150, the shape of cam groove 150 defining the location of the roller cam follower and thus the axial positioning of reverse shift shaft 192, first and second gear shift shaft 196, or third and fourth gear shift shaft 200.

FIG. 12 is a simplified mechanical diagram showing the path of the roller cam follower inside the rotary channel cam 132 as rotary channel cam 132 is rotated in an angular fashion. X corresponds to 30° of angular rotation, Y corresponds to 60° of angular rotation, and Z corresponds to 30° of angular rotation. Since reverse roller cam follower 194, first and second gear roller cam follower 198 and third and fourth gear roller cam follower 202 are spaced at 120° of angular rotation, X plus Y plus Z comprise 120° of angular rotation in total such that at most only two roller cam followers are held within cam groove 150 at any given time. X' occupies 15° of angular rotation and Z' occupies approximately 22° of angular rotation. X' and Z' provide entry and exit of the roller cam follower such that when two roller cam followers reside in cam groove 150, the first roller cam follower is within X' and the second roller cam follower is within Z'. Rotary channel cam 132 from a perspective oriented to distal end 134, rotates counter-clockwise when in the up-shift mode and clockwise when in the down-shift mode. Thus, arrow 206 in FIG. 12 corresponds to a counter-clockwise rotation of rotary channel cam 132 when in the up-shift mode, but it is understood that when in down-shift mode, FIG. 12 would rotate in a direction opposite to arrow 206. When shifting from neutral to first gear, rotary channel cam 132 is rotated in a counter-clockwise direction, and first and second gear roller cam follower 198 enters at up-shift channel entrance 210. As rotary channel cam 132 is rotated 30°, first and second gear roller cam follower 198 moves to position 214 within cam groove 150.

FIGS. 5–10 are simplified mechanical diagrams taken along line 5—5 of FIG. 4 illustrating the relative positioning of reverse shift shaft 192, first and second gears shift shaft 196, and third and fourth gear shift shaft 200, while transmission 78 is in either reverse, neutral, or forward gears 1–4. FIGS. 5–10 are described in relation to FIG. 12.

Figure 5:
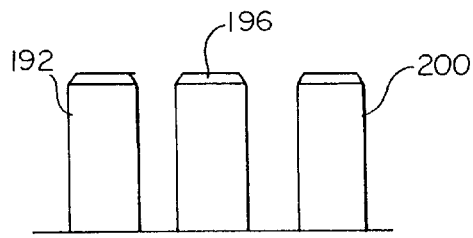
FIG. 5 is a simplified mechanical diagram taken along line 5—5 in FIG. 4.

FIG. 5 shows reverse shift shaft 192, first and second gear shift shaft 196, and third and fourth gear shift shaft 200 in a neutral position.

Figure 6:
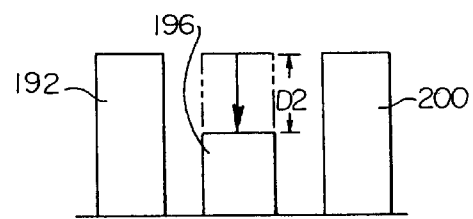
FIG. 6 is a figure similar to that of FIG. 5 showing the progression to first gear.

FIG. 6 shows the progression to first gear from neutral (as in FIG. 5), where first and second gear shift shaft 196 is depressed by a distance D2 of 0.350. With first and second gear roller cam follower 198 located at position 214 in FIG. 12, transmission 78 is thus in first gear.

Figure 7:
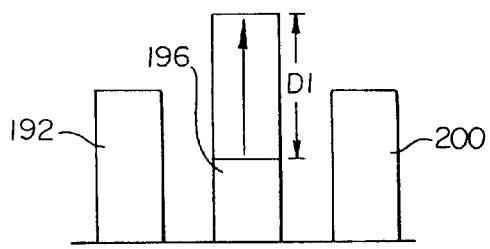
FIG. 7 is a figure similar to that of FIG. 6 showing the progression to second gear.
Figure 8:
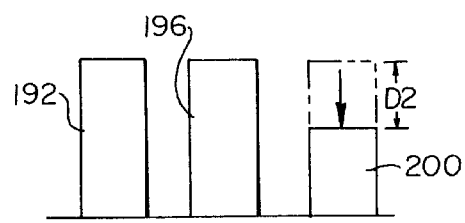
FIG. 8 is a figure similar to that of FIG. 7 showing the progression to third gear.

As rotary channel cam 132 is further rotated an additional 60°, first and second gear roller cam follower 198 moves to position 218. At position 218, first and second gear shift shaft 196 is moved distally outward by a distance D1 of 0.700. This is shown in FIG. 7, which is a figure similar to that of FIG. 6, showing the progression to second gear.

Figure 9:
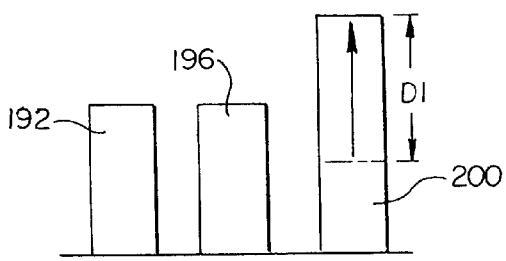
FIG. 9 is a figure similar to that of FIG. 8 showing the progression to fourth gear.

Rotary channel cam 132 is rotated an additional 60° in a counter-clockwise direction to shift transmission 78 to third gear. After the first 52° of counter-clockwise rotation, first and second gear cam roller 198 has passed through up-shift channel exit 212, and third and fourth gear roller cam follower 202 has passed through up-shift channel entrance 210, and is located at a position of 37° of angular rotation inside cam groove 150. After an additional 8° of counter-clockwise angular rotation of rotary channel cam 132, third and fourth gear roller cam follower 202 reaches position 214, thus putting transmission 78 into third gear. This corresponds to FIG. 8, which is a figure similar to that of FIG. 6, and which shows the progression to third gear. At this point, third and fourth gear shift shaft 200 has moved axially a distance D2 of 0.350 towards proximal end of transmission 78. As roller channel cam 132 continues to rotate in a counter-clockwise direction, third and fourth gear roller cam follower 202 moves to position 218 corresponding to a movement of third and fourth gear shift shaft 200 of a proximal distance D1 of 0.700 or relative to the up-shift channel entrance, a distance D3 of 0.350. This is shown in FIG. 9, which shows the progression to fourth gear. It is understood that the down-shift sequence is the reverse of the up-shift sequence with rotary channel cam 132 rotating in a clockwise direction, and as such, the down-shift sequence is not shown. To shift from neutral to reverse gear, the rotary channel cam 132 is oriented as shown in FIG. 13. Rotary channel cam 132 is rotated in a clockwise direction with rotary channel cam indexer 126 set in the down-shift mode where the rotation of rotary channel cam 132 is as was described earlier.

FIG. 18 shows a view similar to FIG. 13, illustrating a progression from neutral to reverse with the shifting indexer in home return position. FIG. 18 shows lock-out stop 224, pivot 226, reverse solenoid 40, and reverse lock-out slot 158. Reverse lock-out slot 158 prevents clockwise rotation of rotary channel cam 132 when reverse lock-out stop 224 is positioned within reverse lock-out slot 158 such that surface 230 mates with surface 230' and surface 232 mates with surface 232'. Reverse lock-out slot 158 extends for approximately 60° of angular rotation, thus providing a "staging area" to ensure surface 230 meets surface 230' before surface 232 meets surface 232' as rotary channel cam 132 is rotated in a clockwise direction. When reverse solenoid 40 is activated, shaft 234 is extended in the direction of arrow 236, such that lock-out stop 224 is pivoting about pivot point 226. This pivot is such that solenoid distal end 242 moves in the direction of arrow 243, thus allowing rotary channel cam 132 to rotate further in the clockwise direction as shown by arrow 244. This rotation can continue until reverse roller cam follower 194 meets reverse cam stop 154 (as shown in FIG. 11). The axis of reverse roller cam follower 194, first and second gear roller cam follower 198, and third and fourth gear roller cam follower 202 are approximately 120° of rotation apart in the plane of a circle defined by a radius perpendicular to the axis of the shift shafts. The radius defining roller surface 248 of first and second gear roller cam follower 198, and roller surface 250 of third and fourth gear roller cam follower 202, is approximately 1.5 inches. The radius defining roller surface 252 of reverse roller cam follower however is approximately 2 inches. This allows reverse roller cam follower 194 to ride within reverse cam slot 152 as shown in FIG. 11, rather than cam groove 150, to allow effective placement of transmission 78 in reverse gear. This reverse cam slot 152 is necessary due to a greater length of travel required axially and distally of reverse shift shaft 192 to place transmission 78 in reverse gear.

Figure 10:
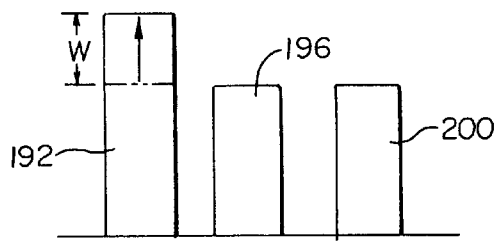
FIG. 10 is a figure similar to that of FIG. 9 showing the progression from neutral to reverse.

FIG. 10 shows a figure similar to that of FIG. 9, showing the progression from neutral to reverse gear. Here, reverse shift shaft 192 is extended distally approximately a distance W of 0.460 corresponding to a clockwise rotation of rotary channel cam 132 of 30°. This effectively moves reverse roller cam follower 194 from the up-shift channel exit 212 to a position adjacent to position 218 but in the reverse cam slot 152, rather than cam groove 150. Reverse solenoid 40 is activated by placing reverse lockout switch 38 into an enabling position. Once reverse switch 38 is released, after rotary channel cam is rotated counter-clockwise from reverse to neutral, reverse lock-out stop 224 will then prohibit a subsequent clockwise rotation back into reverse.

FIG. 17 shows an exploded perspective view of the rotary indexing shifter 22. Bleeder fitting 256 provides access to hydraulic fluid lumen 160. Undesired air can be released from hydraulic fluid lumen 160 by rotating bleeder fitting 256 in a counter-clockwise rotation, thus allowing the air to be released through proximal end 258. Spring 260 has a distal end 262 and a proximal end (not shown) which is positioned in hole 264. The proximal end of spring 260 rests against top plate 100 while the distal end 262 of spring 260 provides a tension against ball 266. Ball 266 rides in one of eleven indentations 268 located on distal surface 134 of rotary channel cam 132 thus providing a holding force. The holding force resists unintentional positioning of rotary channel cam 132. Ball 266 is positioned in one of the eleven indentations 268 when transmission 78 is placed in one of the four forward gear ratios, e.g. first gear, second gear, third gear, or fourth gear, is placed in neutral, or is placed in reverse. When rotary channel cam 132 is rotated in either a clockwise or counter-clockwise direction from either up-shift pawl 128 or down-shift pawl 130 contacting distal surface 134 of rotary channel cam 132 as shown in FIGS. 13 and 14, the holding force provided by ball 266 riding in one of the eleven indentations 268 located on distal surface 134 of rotary channel cam 132 prevents rotary channel cam 132 from unintentionally rotating beyond the desired position. First magnetic reed switch 104 is positioned in reed switch mounting hole 274. Second magnetic reed switch 108 is positioned in reed switch mounting hole 276. Third magnetic reed switch 112 is positioned in reed switch mounting hole 278. Fourth magnetic reed switch 116 is positioned in reed switch mounting hole 280. Fifth magnetic reed switch 120 is positioned in reed switch mounting hole 282. Sixth magnetic reed switch 124 is positioned in reed switch mounting hole 284. Rotary channel cam 132 further has a magnet 270 inside aluminum slug 272. The six magnetic reed switches are mounted such that when rotary channel cam 132 is rotated either in a clockwise or counterclockwise direction, they pass in close proximity to magnet 270. Magnetic reed switches are well known in art and "close" or "open" an electrical connection between two terminals. The connection is "closed" when the magnetic reed switch is in close proximity to the magnet, and the connection is "open" when the magnetic reed switch is not in close proximity to the magnetic reed switch. First magnetic reed switch 104 provides electrical connection to a fourth gear indicator light (not shown). Second magnetic reed switch 108 provides electrical connection to a third gear indicator light (not shown). Third magnetic reed switch 112 provides electrical connection to a second gear indicator light (not shown). Fourth magnetic reed switch 116 provides electrical connection to a first gear indicator light (not shown). Fifth magnetic reed switch 120 provides electrical connection to a neutral indicator light (not shown). Sixth magnetic reed switch 124 provides electrical connection to a reverse gear indicator light (not shown). Thus when rotary channel cam 132 is rotated in either a clockwise or counterclockwise direction, and transmission 78 is placed in one of the four forward gear ratios, e.g. first gear, second gear, third gear, or fourth gear, is placed in neutral, or is placed in reverse, the appropriate gear indicator light (not shown) will illuminate the current gear. If rotary channel cam 132 is oriented such that first magnetic reed switch 104 is positioned in close proximity over magnet 270, first magnetic reed switch 104 will be in a "closed" position thus providing an electrical signal to and illuminate the fourth gear indicator light (not shown) resulting in an indication that transmission 78 is in fourth gear. Similarly if second magnetic reed switch 108, third magnetic reed switch 112, fourth magnetic reed switch 116, fifth magnetic reed switch 120, or sixth magnetic reed switch 124 are positioned in close proximity over magnet 270, the respective magnetic reed switch will be in a "closed" position thus providing an electrical signal to and illuminating the respective gear indicator light (not shown).

All other reference numerals shown have been herein described. FIG. 17 shows a more illustrative view of the relationship between the various components of rotary indexing shifter 22. In particular, it shows the relative positioning of the up-shift solenoid 50, the down-shift solenoid 52, and reverse solenoid 40. Rotary channel cam indexer 126 is also shown in its relative position to rotary channel cam 132.

FIG. 23 and FIG. 24 are perspective and cut-away views respectively of the hydraulic shift arm apparatus 286. FIG. 23 is an alternative embodiment of hydraulic shift lever apparatus 28 and shows generally the hydraulic shift arm apparatus 286 and the proximal end 32 of hydraulic line 30. The proximal end 32 of hydraulic line 30 is in fluid communication with hydraulic fluid chamber 330 of hydraulic shift arm apparatus 286. In addition, distal end 34 of hydraulic line 30 is in fluid communication with the proximal end 24 of rotary indexing shifter 22. Shift arm 288 further has a proximal end 290 and a distal end 292. Handle 294 is demountably attached to proximal end 290 of shift arm 288. Handle 294 provides for easy gripping and convenient access to first alternative shift direction switch 295 and alternative reverse lockout switch 296. First alternative shift direction switch 295 and alternative reverse lockout switch 296 perform the same function respectively as shift direction switch 48 and reverse lockout switch 38 as discussed above. Hydraulic fluid reservoir 298 further has access port 304 positioned at proximal end 290 of handle 288. Access port 304 provides access to hydraulic fluid chamber 330 to provide means for filling hydraulic fluid reservoir 298 with hydraulic fluid when handle 288 is removed from proximal end 290 of handle 288. Distal end 292 of shift arm 288 is attached to wheel 306. Shift arm 288 is pivotally attached to base 308. Upshift stop surface 312 is positioned at proximal end 310 of base 308, and downshift stop surface 316 is positioned at distal end 314 of base 308. Base 308 contains second alternative shift direction switch 300. Since second alternative shift direction switch 300 performs the same function as first alternative shift direction switch 295, only one of first alternative shift direction switch 295 or second alternative shift direction switch 300 is necessary. Second alternative shift direction switch 300 is shown to illustrate an alternative location. First alternative shift direction switch 295 and second alternative shift direction switch 300 each have two positions. In the first position, upshift solenoid 50 is activated. In the second position, downshift solenoid 52 is activated. First alternative shift direction switch 295 or second alternative shift direction switch 300 determine whether the current indexing direction of the rotary indexing shifter 22 is in sequentially increasing or sequentially decreasing gear numbers. Furthermore, first alternative shift direction switch 295 and second alternative shift direction switch 300 perform the same function as shift direction switch 48 described above. First alternative shift direction switch 295 is of the rocker type and has a first position 348 and a second position 350. First alternative shift direction switch 295 can be engaged in first position or second position by applying force at switch surface 352 at either first position 348 or at second position 350 respectively. Second alternative shift direction switch 300 has a first position 354, a second position 356, and a switch surface 358. Second alternative shift direction switch 300 can be engaged in a first position or second position by applying a force to switch surface 358 at first position 354 or second position 356, respectively.

When handle 294 is pivotally moved in the direction of proximal end 310 of base 308 or distal end 314 of base 308, spring 332 provides a constant force K in the direction of wheel 306, thus providing a force K at switch surface 358 to engage either the first position 354 or second position 356. When handle 294 is pivotally moved in the direction of proximal end 310 of base 308 about pivot point 318, wheel 306 is moved from neutral position 320 towards distal end 314 of base 308 until wheel surface 322 contacts downshift stop surface 316 at downshift position 336 as shown in FIG. 24. As wheel 306 travels from neutral position 320 to down-shift position 336, down-shift slope 324 forces piston 326 to slidably travel in a direction perpendicular to the direction of travel of wheel 306 and in the direction of pivot point 318. This direction is shown by arrow 328. Piston 326 traveling in a direction perpendicular to the direction of travel of wheel 306 results from angle $\phi$ being greater relative to horizontal surface 342 of base 308 than the angle of travel of wheel 306 relative to horizontal surface 342 when wheel 306 is in downshift position 336.

When handle 294 is pivotally moved in the direction of distal end 314 of base 308 about pivot point 318, wheel 306 is moved from neutral position 320 towards proximal end 310 of base 308 until wheel surface 322 contacts upshift stop surface 312 on base 308 at up-shift position 338. As wheel 306 travels from neutral position 320 to upshift position 338, up-shift slope 340 forces piston 326 to slidably travel in a direction perpendicular to the direction of travel of wheel 306 by the similar means as when handle 294 is pivotally moved in the direction of proximal end 310 of base 308 as described above.

Whether handle 294 is pivotally moved in the direction of proximal end 310 of base 308 or distal end 314 of base 308, piston 326 slidably moves in a direction perpendicular to the direction of travel of wheel 306, in the direction shown by arrow 328, thus compressing spring 332. Piston 326 further has seal 346 which sealably positions piston 326 within hydraulic fluid chamber 330. As spring 332 is compressed, hydraulic fluid chamber 330 is decreased in volume resulting in hydraulic fluid being forced under pressure into proximal end 32 of hydraulic line 30. Rotary indexing shifter 22, in fluid communication with distal end 34 of hydraulic line 30, therefore causes a shifting of gears to occur by means described earlier. When wheel 322 is moved from downshift position 336 to neutral position 320, spring 332 provides a returning force K against piston 326 in a direction opposite arrow 328 thus returning spring 332 to a maximum extension when wheel 306 is in neutral position 320. As spring 332 is returned to the maximum extension, hydraulic fluid chamber 330 is increased in volume back to the initial volume.

Check valve 360 is in fluid communication with hydraulic fluid reservoir 298 and hydraulic fluid chamber 330 through lumen 364. When piston 326 is moving a direction perpendicular to the travel of wheel 306 such that hydraulic fluid chamber 330 is decreased from it's original volume, check ball 362 is slidably positioned at proximal end 366 of lumen 364 to block movement of hydraulic fluid from hydraulic fluid chamber 330 into hydraulic fluid reservoir 298. When wheel 306 is subsequently moved back to neutral position 320 from either proximal end 310 of base 308, or distal end 314 of base 308, hydraulic fluid chamber 330 is increased in volume to the original volume. Check ball 362 is then slidably moved in lumen 364 towards distal end 368 of lumen 364, allowing hydraulic fluid from hydraulic fluid reservoir 298 to be drawn into hydraulic fluid chamber 330, thus insuring a maximum hydraulic fluid capacity in hydraulic fluid chamber 330. As hydraulic fluid may be lost due to a system leak, it is understood that hydraulic reservoir 298 is required to insure maximum hydraulic fluid capacity in hydraulic fluid chamber 330 to provide for proper control of shifting of rotary indexing shifter 22.

Figure 25:
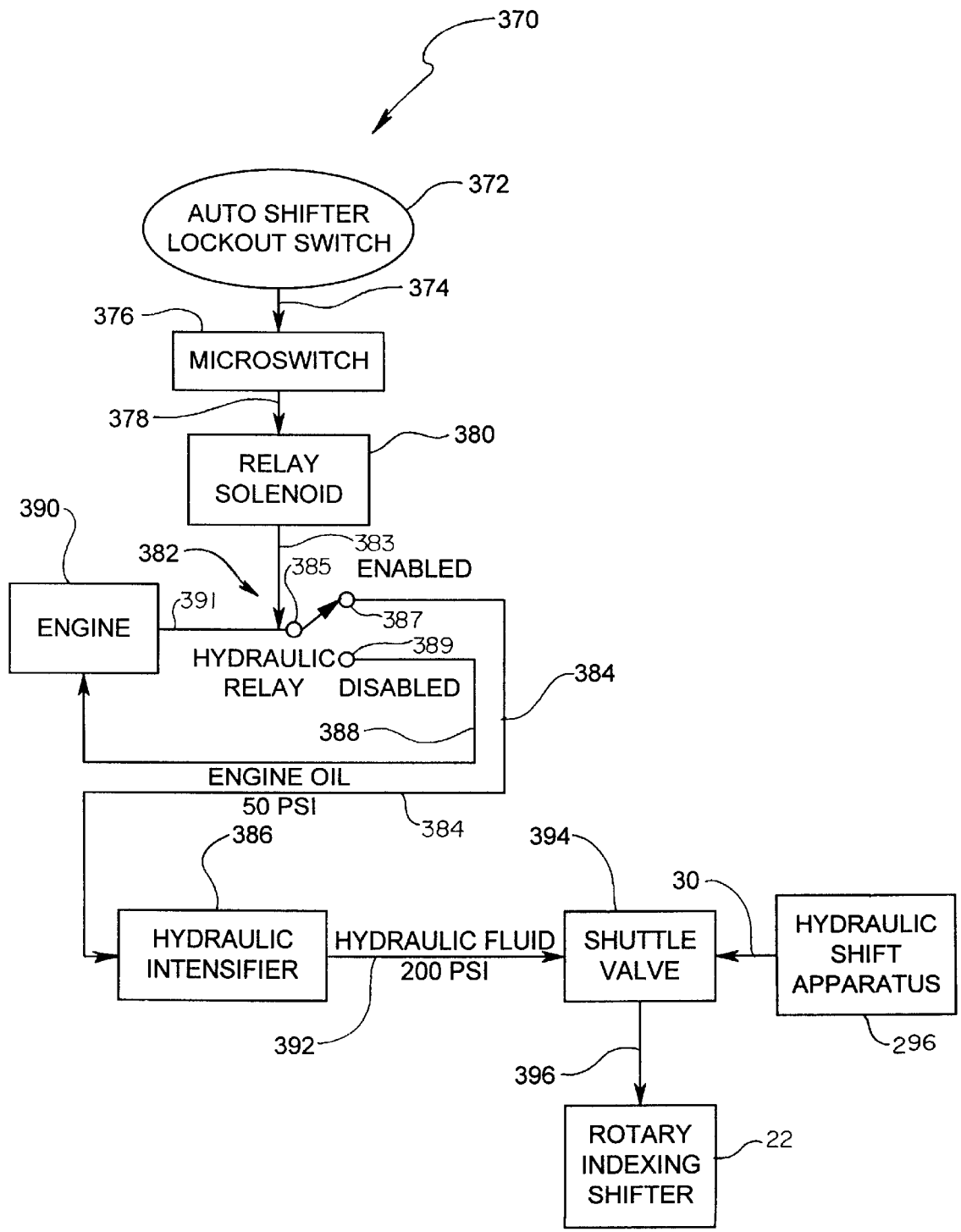
FIG. 25 is a diagram of the pressure assisted hydraulic shifting apparatus.

Another embodiment of the present invention is to utilize the oil pressure created within the internal oil reservoir of an internal combustion engine to provide hydraulic fluid pressure to cause rotary indexing shifter 22 to shift. Internal combustion engines are well known in the art. Automobile internal combustion engines typically have engine oil pressures of 50 psi. FIG. 25 is a diagram of the pressure assisted hydraulic shifting apparatus 370. Auto shifter lockout switch 372 is directly coupled to power and ground bus connections to selectively provide power to microswitch 376. Auto shifter lockout switch 372 is a two-position electrical switch of a type well known in the art and is coupled to microswitch 376 through wire 374. Auto shifter lockout switch 372 provides power to microswitch 376 when in a first position, and provides a ground connection to microswitch 376 when in a second position. Microswitch 376 is a two-position electrical switch of a type well known in the art and is coupled to relay solenoid 380 through wire 378. Microswitch 376 provides power to relay solenoid 380 when in a first position, and provides a ground connection to relay solenoid 380 when in a second position. Microswitch 376 can selectably positioned in a first position and a second position. In a preferred embodiment, microswitch 376 can be coupled to a foot-operated clutch pedal. When the foot-operated clutch pedal is engaged, microswitch 376 is selectably engaged in the first position. When in the first position, microswitch 376 provides power to relay solenoid 380 when auto shifter lockout switch 372 is in the first position. If auto shifter lockout switch is in the second position, Microswitch 376 cannot provide power to relay solenoid 380. When the foot-operated clutch pedal is disengaged, microswitch 376 is selectably engaged in the second position. When in the second position, microswitch 376 removes power from relay solenoid 380 when auto shifter lockout switch 372 is in the first position. Relay solenoid 380 is coupled to hydraulic relay 382. Hydraulic relay 382 is a fluid switch of a type well known in the art having a common terminal 385, an enabled terminal 387, and a disabled terminal 389. When relay solenoid 380 is activated, hydraulic relay 382 is positioned in the enabled position as shown in FIG. 25. When relay solenoid 380 is not activated, hydraulic relay 382 is positioned in the disabled position. When hydraulic relay 382 is in the enabled position, common terminal 385 is in fluid communication with enabled terminal 387. When hydraulic relay 382 is in the disabled position, common terminal 385 is in fluid communication with disabled terminal 389. Disabled terminal 389 is coupled to and is in fluid communication with the internal engine oil reservoir through oil line 388. Engine 390 is in fluid communication with oil line 391. Oil line 391 is in fluid communication with common terminal 385. Thus when hydraulic relay 382 is in the disabled position, oil line 391 is coupled to oil line 388 and the internal engine oil reservoir is shunted to itself. When hydraulic relay 382 is in the enabled position, the internal oil reservoir of engine 390 is in fluid communication with enabled terminal 387 and therefore with hydraulic intensifier 386 through oil line 384. Hydraulic intensifier 386 further is coupled to hydraulic line 392. Hydraulic intensifier 386 converts an input oil pressure on oil line 384 by a factor of four to a hydraulic oil pressure on hydraulic line 392. FIG. 25 shows an engine oil pressure of 50 lbs. per square inch of pressure on oil line 384 is intensified to an hydraulic fluid pressure of 200 psi on hydraulic line 392. When hydraulic relay 382 is in the disabled position, the internal oil reservoir of engine 390 is in fluid communication with disabled terminal 388 and oil line 384 is decoupled from oil line 391 resulting in 0 psi of pressure input to hydraulic intensifier 386. Hydraulic line 392 therefore has 0 psi of hydraulic fluid pressure. Shuttle valve 394 shown in FIG. 4 selectably communicatively couples the hydraulic fluid of either hydraulic line 392 or hydraulic line 30 to hydraulic line 396. Shuttle line 394 is pressure selectable and selectively couples whichever of hydraulic line 392 or hydraulic line 30 is pressurized with a hydraulic line pressure greater than 0 psi . In this embodiment it is assumed that at least one of hydraulic line 392 or hydraulic line 30 has a hydraulic fluid pressure of 0 psi. Since rotary indexing shifter 22 is in fluid communication with hydraulic line 396, application of hydraulic fluid pressure to hydraulic line 396 causes a shifting of gears to occur through means discussed above.

Figure 26:
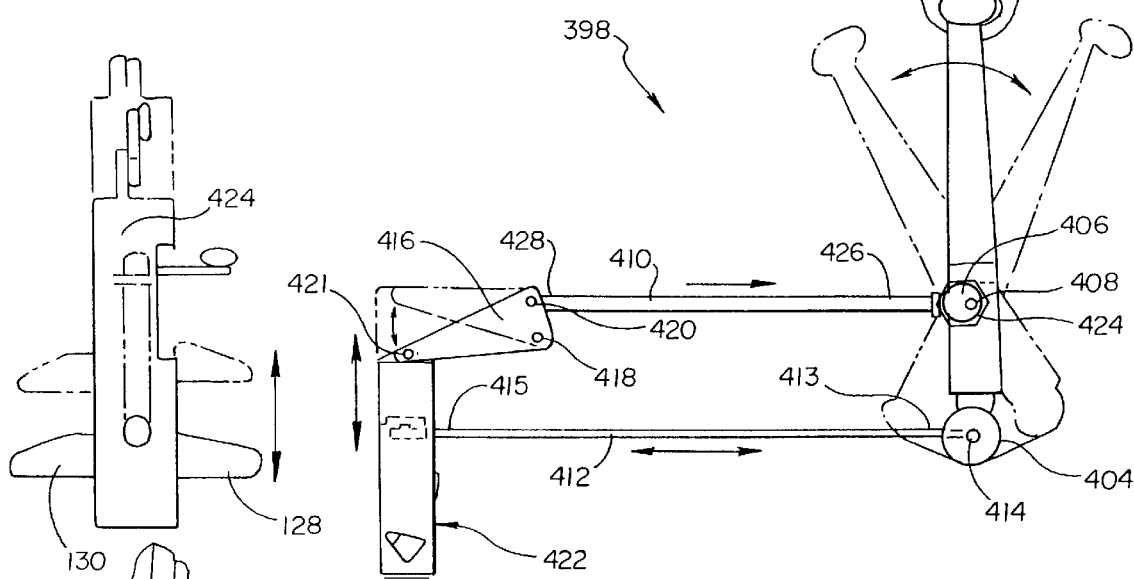
FIG. 26 is a detailed view showing the manual shifting assembly.
Figure 27:
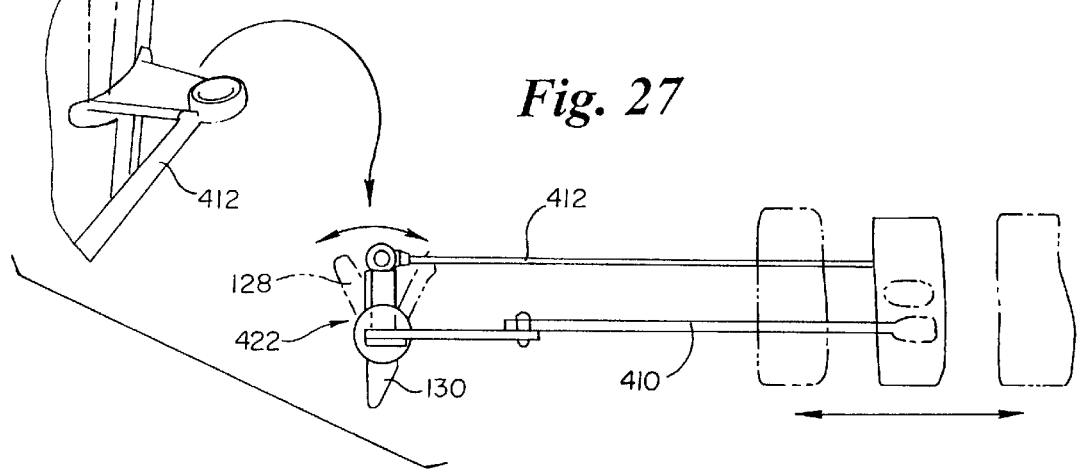
FIG. 27 is a top view of the manual shifting assembly.
Figure 28:
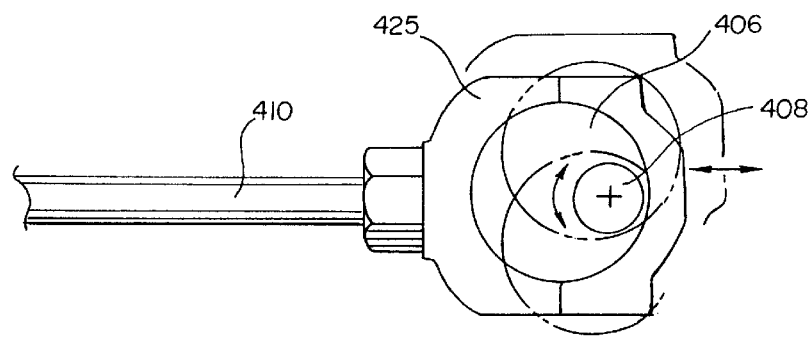
FIG. 28 is an enlarged view showing the eccentric attached to the bracket.

FIGS. 26–28 show detailed views of yet another alternative embodiment of the present invention. This alternative embodiment utilizes manual shifting assembly 398 in place of hydraulic shift arm apparatus 286. Mechanical shift arm 400 has a proximal end 402 and a distal end 404. Mechanical shift arm 400 is rigidly attached to eccentric 406 by pivot point 408. First arm 410 is rotatably fastened to eccentric 406 at proximal end 426, and second arm 412 is rotatably fastened to pin 414 at proximal end 413. Indexing lever 416 rotates about pivot point 418, and is rotatably fastened to proximal end 428 of first arm 410 by pin 420. Indexing lever 416 is rotatably attached to indexer housing 424 of mechanical rotary channel cam indexer 422 through pin 421. It is seen that mechanical rotary channel cam indexer 422 differs from rotary channel cam indexer 126 only in that indexer housing 424 provides means of rotational attachment to indexing lever 416 and second arm 412. Mechanical rotary channel cam indexer 422 is moved in a vertical direction through a translation of movement of mechanical shift arm 400 through eccentric 406. As mechanical shift 400 is moved from a neutral to an up-shift position as shown in FIG. 26, eccentric 406, which is rigidity attached to pivot point 408 and slidably attached to bracket 425, results in a movement of first arm 410 in the direction of proximal end 426 of first arm 410. The slidable attachment between eccentric 406 and bracket 425 is a bearing type well known in the art. As first arm 410 moves towards proximal end 426, indexing lever 416 is rotated about pivot point 418 through pin 420, resulting in a vertical translational movement of mechanical rotary channel cam indexer 422. In addition, as mechanical shift arm 400 is moved to the up-shift position, second arm 412 moves distally in a direction towards distal end 415. This results in a counter-clockwise rotation of mechanical rotary channel cam indexer 422 through second arm 412 thus rotating mechanical rotary channel cam indexer 422 into the upshift position. When mechanical shift arm 400 is pivotally moved from the neutral to the downshift position, eccentric 406 is slidably attached to bracket 425 and results in movement of first arm 410 towards proximal end 426 of first arm 410 thus pivoting indexer lever 416 about pivot point 418 resulting in an upward transitional movement of mechanical rotary channel cam indexer 422. In addition, as mechanical shift arm 400 is moved to the downshift position, second arm 412 moves proximally in a direction towards proximal end 413. This results in a clockwise rotation of mechanical rotary channel cam indexer 422 through second arm 412, thus rotating mechanical rotary channel cam indexer 422 into the downshift position. Mechanical rotary channel cam indexer 422 rotates rotary channel cam 132 through the same means as rotary channel cam indexer 126 as discussed earlier in reference to FIGS. 13–16, and 18–21.

Having thus described the preferred embodiments of the present invention, those of skill in the art will readily appreciate that yet other embodiments may be made and used within the scope of the claims hereto attached.

I claim:

1. A gear shifting apparatus, comprising:
    means for longitudinally positioning each of a plurality of shift shafts of a multi-speed manual transmission so as to correspond with a particular one of a plurality of gear ratios of the multi-speed manual transmission wherein the plurality of shift shafts include a first shift shaft and a second shift shaft, each having a first, a second, and a third position, and a third shift shaft having a first and a second position; and
    means, coupled to said means for longitudinally positioning each of a plurality of shift shafts, for rotating said means for longitudinally positioning each of a plurality of shift shafts to a particular one of a plurality of angular positions in the multi-speed manual transmission, each of the plurality of angular positions corresponding to one of the plurality of gear ratios of the multi-speed manual transmission.

2. The apparatus of claim 1 further comprised of means for shifting coupled to the means for rotation for axially positioning the means for rotation, the angular rotation of the means for positioning being proportional to an axial linear positioning of the means for rotation.

3. The apparatus of claim 2 wherein the means for shifting is in fluid communication with the means for rotation, said shift apparatus forcing a hydraulic fluid under pressure to axially position the means for rotation.

4. The apparatus of claim 2 wherein the means for shifting is further comprised of:
    an internal combustion engine having an internal oil reservoir; and
    intensifying means in fluid communication with the internal oil reservoir and in fluid communication with the means for rotation to convert an internal oil reservoir pressure to a higher hydraulic fluid pressure and force the hydraulic fluid under pressure to axially position the means for rotation.

5. The apparatus of claim 1 further comprised of selectable means to prevent an unintentional rotation of the means for positioning to prevent an unintentional engagement of a predetermined gear ratio.

6. The apparatus of claim 5 wherein the selectable means is comprised of reverse lockout means to prevent unintentional engagement of reverse gear.

7. The apparatus of claim 1 further comprising means for indication to indicate the particular one of the plurality of gear ratios the transmission is engaged in.

8. The apparatus of claim 7 wherein the means for indication is further comprised of a plurality of magnetic reed switches and a magnet, said magnet attached to a surface of the means for positioning, each particular one of said plurality of magnetic reed switches corresponding to the particular one of the plurality of gear ratios, each particular one of the plurality of angular positions of the means for positioning corresponding to said magnet being positioned in close proximity to at least one particular one of the plurality of magnetic reed switches.

9. The apparatus of claim 1, wherein the means for rotation is further comprised of an up-shift pawl and a down-shift pawl, the means for positioning having a plurality of dowels positioned at a radius from the axis of rotation of the means for positioning, either the upshift pawl or the down-shift pawl contacting said one of said plurality of dowels to translate an axial linear movement of the means for rotation to an angular rotation of the means for positioning.

10. The apparatus of claim 9, wherein the rotation of the means for positioning is proportional to the axial linear movement of the means for rotation.

11. The apparatus of claim 9, wherein the means for rotation is further comprised of means to select either the up-shift pawl or the down-shift pawl to contact the one of the plurality of dowels, the selection of the upshift-pawl corresponding to a sequentially increasing gear number, the selection of the downshift pawl corresponding to a sequentially decreasing gear number.

12. The apparatus of claim 1, wherein the means for positioning further has a cam groove, the cam groove having an inclined surface positioned at a radius from the axis of rotation of the means for positioning, a plurality of cam followers coupled to the plurality of shift shafts and slidably positioned within the cam grove, each particular one of the plurality of cam followers corresponding to the particular one of the plurality of shift shafts, each particular one of the plurality of shift shafts having a longitudinal position corresponding to a particular one of a plurality of angular positions of the means for positioning.

13. The apparatus of claim 12, wherein the plurality of shift shafts further comprise:

a first angular position of the means for positioning corresponding to the first shift shaft being in the first position, the second shift shaft being in the first position, and the third shift shaft being in the first position;

a second angular position of the means for positioning corresponding to the first shift shaft being in the second position, the second and third shift shafts being in the first position;

a third angular position of the means for positioning corresponding to the first shift shaft being in the third position, the second and third shift shafts being in the first position;

a fourth angular position of the means for positioning corresponding to the second shift shaft being in the second position, the first and third shift shafts being in the first position;

a fifth angular position of the means for positioning corresponding to the second shift shaft being in the third position, the first and third shift shafts being in the first position; and a sixth angular position of the means for positioning corresponding to the third shift shaft being in the second position, the first and second shift shafts being in the first position.

14. The apparatus of claim 13, wherein the first angular position of the means for positioning corresponds to the transmission being in a neutral position.

15. The apparatus of claim 13, wherein the second angular position of the means for positioning corresponds to the transmission being in a first gear ratio.

16. The apparatus of claim 13, wherein the third angular position of the means for positioning corresponds to the transmission being in a second gear ratio.

17. The apparatus of claim 13, wherein the fourth angular position of the means for positioning corresponds to the transmission being in a third gear ratio.

18. The apparatus of claim 13, wherein the fifth angular position of the means for positioning corresponds to the transmission being in a fourth gear ratio.

19. The apparatus of claim 13, wherein the sixth angular position of the means for positioning corresponds to the transmission being in a reverse gear ratio.

20. The apparatus of claim 13, wherein the angular rotation of the means for positioning between the first angular position and the second angular position is 30°.

21. The apparatus of claim 13, wherein the angular rotation of the means for positioning between the second angular position and the third angular position is 60°.

22. The apparatus of claim 13, wherein the angular rotation of the means for positioning between the third angular position and the fourth angular position is 60°.

23. The apparatus of claim 13, wherein the angular rotation of the means for positioning between the fourth angular position and the fifth angular position is 60°.

24. The apparatus of claim 13, wherein the angular rotation of the means for positioning between the first angular position and the sixth angular position is 30°.

25. The apparatus of claim 21, wherein the means for positioning having an angular position which is between the second angular position and the third angular position and which is 30° from both the second angular position and the third angular position corresponds to the transmission being in a neutral position.

26. The apparatus of claim 22, wherein the means for positioning having an angular position which is between the third angular position and the fourth angular position and which is 30° from both the third angular position and the fourth angular position corresponds to the transmission being in a neutral position.

27. The apparatus of claim 23, wherein the means for positioning having an angular position which is between the fourth angular position and the fifth angular position and which is 30° from both the fourth angular position and the fifth angular position corresponds to the transmission being in a neutral position.

28. A gear shifting apparatus, comprising:

a rotary channel cam for longitudinally positioning each of a plurality of shift shafts of a multi-speed manual transmission so as to correspond with a particular one of a plurality of gear ratios of the multi-speed manual transmission, the plurality of shift shafts including a first shift shaft and a second shift shaft, each having a first, a second, and a third position, and a third shift shaft having a first and a second position; and an indexer coupled to said rotary channel cam for rotating said rotary channel cam to a particular one of a plurality of angular positions, each of the plurality of angular positions corresponding to one of the plurality of gear ratios of the multi-speed manual transmission.

29. The apparatus of claim 28 further comprised of a shift apparatus coupled to the indexer for axially positioning the indexer, the angular rotation of the rotary channel cam being proportional to an axial linear positioning of the indexer.

30. The apparatus of claim 29 wherein the shift apparatus is in fluid communication with the indexer, said shift apparatus forcing a hydraulic fluid under pressure to axially position the indexer.

31. The apparatus of claim 29 wherein the shift apparatus is further comprised of:

an internal combustion engine having an internal oil reservoir; and intensifying means in fluid communication with the internal oil reservoir and in fluid communication with the indexer to convert an internal oil reservoir pressure to a higher hydraulic fluid pressure and force the hydraulic fluid under pressure to axially position the indexer.

32. The apparatus of claim 28 further comprised of selectable means to prevent an unintentional rotation of the rotary channel cam to prevent an unintentional engagement of a predetermined gear ratio.

33. The apparatus of claim 32 wherein the selectable means is comprised of reverse lockout means to prevent unintentional engagement of reverse gear.

34. The apparatus of claim 28 further comprising means for indication to indicate the particular one of the plurality of gear ratios the transmission is engaged in.

35. The apparatus of claim 34 wherein the means for indication is further comprised of a plurality of magnetic reed switches and a magnet, said magnet attached to a surface of the rotary channel cam, each particular one of said plurality of magnetic reed switches corresponding to the particular one of the plurality of gear ratios, each particular one of the plurality of angular positions of the rotary channel cam corresponding to said magnet being positioned in close proximity to at least one particular one of the plurality of magnetic reed switches.

36. The apparatus of claim 28, wherein the indexer is further comprised of an up-shift pawl and a down-shift pawl, the rotary channel cam having a plurality of dowels positioned at a radius from the axis of rotation of the rotary channel cam, either the up-shift pawl or the down-shift pawl contacting said one of said plurality of dowels to translate an axial linear movement of the indexer to an angular rotation of the rotary channel cam indexer.

37. The apparatus of claim 36, wherein the rotation of the rotary channel cam is proportional to the axial linear movement of the indexer.

38. The apparatus of claim 36, wherein the indexer is further comprised of means to select either the up-shift pawl or the down-shift pawl to contact the one of the plurality of dowels, the selection of the upshift-pawl corresponding to a sequentially increasing gear number, the selection of the downshift pawl corresponding to a sequentially decreasing gear number.

39. The apparatus of claim 28, wherein the rotary channel cam further has a cam groove, the cam groove having an inclined surface positioned at a radius from the axis of rotation of the rotary channel cam, a plurality of cam followers coupled to the plurality of shift shafts and slidably positioned within the cam grove, each particular one of the plurality of cam followers corresponding to the particular one of the plurality of shift shafts, each particular one of the plurality of shift shafts having a longitudinal position corresponding to a particular one of a plurality of angular positions of the rotary channel cam.

40. The apparatus of claim 39, wherein the plurality of shift shafts further comprise:
   a first angular position of the rotary channel cam corresponding to the first shift shaft being in the first position, the second shift shaft being in the first position, and the third shift shaft being in the first position;
   a second angular position of the rotary channel cam corresponding to the first shift shaft being in the second position, the second and third shift shafts being in the first position;
   a third angular position of the rotary channel cam corresponding to the first shift shaft being in the third position, the second and third shift shafts being in the first position;
   a fourth angular position of the rotary channel cam corresponding to the second shift shaft being in the second position, the first and third shift shafts being in the first position;
   a fifth angular position of the rotary channel cam corresponding to the second shift shaft being in the third position, the first and third shift shafts being in the first position; and
   a sixth angular position of the rotary channel cam corresponding to the third shift shaft being in the second position, the first and second shift shafts being in the first position.

41. The apparatus of claim 40, wherein the first angular position of the rotary channel cam corresponds to the transmission being in a neutral position.

42. The apparatus of claim 40, wherein the second angular position of the rotary channel cam corresponds to the transmission being in a first gear ratio.

43. The apparatus of claim 40, wherein the third angular position of the rotary channel cam corresponds to the transmission being in a second gear ratio.

44. The apparatus of claim 40, wherein the fourth angular position of the rotary channel cam corresponds to the transmission being in a third gear ratio.

45. The apparatus of claim 40, wherein the fifth angular position of the rotary channel cam corresponds to the transmission being in a fourth gear ratio.

46. The apparatus of claim 40, wherein the sixth angular position of the rotary channel cam corresponds to the transmission being in a reverse gear ratio.

47. The apparatus of claim 40, wherein the angular rotation of the rotary channel cam between the first angular position and the second angular position is 30°.

48. The apparatus of claim 40, wherein the angular rotation of the rotary channel cam between the second angular position and the third angular position is 60°.

49. The apparatus of claim 40, wherein the angular rotation of the rotary channel cam between the third angular position and the fourth angular position is 60°.

50. The apparatus of claim 40, wherein the angular rotation of the rotary channel cam between the fourth angular position and the fifth angular position is 60°.

51. The apparatus of claim 40, wherein the angular rotation of the rotary channel cam between the first angular position and the sixth angular position is 30°.

52. The apparatus of claim 48, wherein the rotary channel cam having an angular position which is between the second angular position and the third angular position and which is 30° from both the second angular position and the third angular position corresponds to the transmission being in a neutral position.

53. The apparatus of claim 49, wherein the rotary channel cam having an angular position which is between the third angular position and the fourth angular position and which is 30° from both the third angular position and the fourth angular position corresponds to the transmission being in a neutral position.

54. The apparatus of claim 50, wherein the rotary channel cam having an angular position which is between the fourth angular position and the fifth angular position and which is 30° from both the fourth angular position and the fifth angular position corresponds to the transmission being in a neutral position.

55. A method of shifting gears, comprising the steps of:
   providing a rotary channel cam for longitudinally positioning each of a plurality of shift shafts of a multi-speed manual transmission so as to correspond with a particular one of a plurality of gear ratios of the multi-speed manual transmission, the plurality of shift shafts including a first shift shaft and a second shift shaft, each having a first, a second, and a third position, and a third shift shaft having a first and a second position;
   rotating said rotary channel cam to a first angular position to longitudinally position the first shift shaft of the multi-speed manual transmission to the first position thereof, the second shift shaft of the multi-steed manual transmission to the first position thereof, and the third shift shaft of the multi-speed manual transmission to the first position thereof so as to place the multi-speed manual transmission in a neutral position;
   rotating said rotary channel cam to a second angular position to longitudinally position the first shift shaft of the multi-speed manual transmission to the second position, the second shift shaft of the multi-speed manual transmission to its first position, and the third shift shaft of the multi-speed manual transmission to its first positions so as to place the multi-speed manual transmission in a first gear ratio;
   rotating said rotary channel cam to a third angular position to longitudinally position the first shift shaft of the multi-speed manual transmission to the third position, the second shift shaft of the multi-speed manual transmission to its first position, and the third shift shaft of the multi-speed manual transmission to its first position so as to place the multi-speed manual transmission in a second gear ratio;

rotating said rotary channel cam to a fourth angular position to longitudinally position the first shift shaft of the multi-speed manual transmission to its first position, the second shift shaft of the multi-speed manual transmission to the second position thereof, and the third shift shaft of the multi-speed manual transmission to its first positions so as to place the multi-speed manual transmission in a third gear ratio; and rotating said rotary channel cam to a fifth angular position to longitudinally position the first shift shaft of the multi-speed manual transmission to its first position, the second shift shaft of the multi-speed manual transmission to the third position thereof, and the third shift shaft of the multi-speed manual transmission to its first positions so as to place the transmission in a fourth gear ratio.

56. The method of claim 55 further comprising the step of axially positioning an indexer to rotate the rotary channel cam so that the angular rotation of the rotary channel cam is proportional to the axial positioning of the indexer.

57. The method of claim 56 further comprising the steps of:

providing an oil pressure from an oil reservoir of an internal combustion engine;

converting an internal oil reservoir pressure to a higher hydraulic fluid pressure; and forcing the hydraulic fluid under pressure to axially position the indexer to rotate the rotary channel cam.

58. The method of claim 55 further comprising the step of activating a reverse lockout switch to allow a rotation of the rotary channel cam into the reverse gear ratio.

59. The method of claim 55 further comprising the step of indicating the particular one of the plurality of gear ratios the transmission is engaged in.

60. The method of claim 59 further comprising the step of positioning a magnet attached to a surface of the rotary channel cam in close proximity to at least one particular one of a plurality of magnetic reed switches to indicate the particular one of the plurality of gear ratios the transmission is engaged in.

61. The method of claim 55 further comprising the step of axially positioning an indexer so that either the up-shift pawl or the down-shift pawl contact one of a plurality of dowels to translate an axial linear movement of the indexer to an angular rotation of the rotary channel cam indexer.

62. The method of claim 61 further comprising the step of selecting either the up-shift pawl or the down-shift pawl to contact one of the plurality of dowels so that the selection of the upshift-pawl corresponds to a sequentially increasing gear number, or the selection of the downshift pawl corresponds to a sequentially decreasing gear numbers.

63. The method of claim 55 further comprising the step of rotating the rotary channel cam so that a cam groove of the rotary channel cam slidably positions a plurality of cam followers on an inclined surface of the cam groove, the plurality of cam followers slidably positioned within the cam groove at a radius from the axis of rotation of the rotary channel cam, each particular one of the plurality of cam followers coupled to the particular one of the plurality of shift shafts so that each particular one of the plurality of shift shafts is longitudinally positioned to correspond to a particular one of a plurality of angular positions of the rotary channel cam.

64. The method of claim 63 further comprising the steps of:

rotating the rotary channel cam to a sixth angular position to longitudinally position the first shift shaft to the first position, the second shift shaft to the first position, and the third shift shaft to a second position, to place the transmission in a reverse gear ratio.

65. The method of claim 64 further comprising the step of rotating the rotary channel cam 30° to move from the first angular position to the second angular position.

66. The method of claim 64 further comprising the step of rotating the rotary channel cam 60° to move from the second angular position to the third angular position.

67. The method of claim 64 further comprising the step of rotating the rotary channel cam 60° to move from the third angular position to the fourth angular position.

68. The method of claim 64 further comprising the step of rotating the rotary channel cam 60° to move from the fourth angular position to the fifth angular position.

69. The method of claim 64 further comprising the step of rotating the rotary channel cam 30° to move from the first angular position to the sixth angular position.

70. The method of claim 64 further comprising the step of rotating the rotary channel cam from either the second angular position or the third angular position by 30° to an angular position between both the second angular position and the third angular position to place the transmission in a neutral position.

71. The method of claim 64 further comprising the step of rotating the rotary channel cam from either the third angular position or the fourth angular position by 30° to an angular position between both the third angular position and the fourth angular position to place the transmission in a neutral position.

72. The method of claim 64 further comprising the step of rotating the rotary channel cam from either the fourth angular position or the fifth angular position by 30° to an angular position between both the fourth angular position and the fifth angular position to place the transmission in a neutral position.

* * * * *